US009019183B2

(12) United States Patent
Bita et al.

(10) Patent No.: US 9,019,183 B2
(45) Date of Patent: Apr. 28, 2015

(54) OPTICAL LOSS STRUCTURE INTEGRATED IN AN ILLUMINATION APPARATUS

(75) Inventors: Ion Bita, San Jose, CA (US); Gang Xu, Cupertino, CA (US); Marek Mienko, San Jose, CA (US); Russell W. Gruhlke, Milpitas, CA (US)

(73) Assignee: Qualcomm MEMS Technologies, Inc., San Diego, CA (US)

( * ) Notice: Subject to any disclaimer, the term of this patent is extended or adjusted under 35 U.S.C. 154(b) by 1075 days.

(21) Appl. No.: 12/444,142

(22) PCT Filed: Sep. 24, 2007

(86) PCT No.: PCT/US2007/020680
§ 371 (c)(1),
(2), (4) Date: Apr. 2, 2009

(87) PCT Pub. No.: WO2008/045200
PCT Pub. Date: Apr. 17, 2008

(65) Prior Publication Data
US 2010/0026727 A1   Feb. 4, 2010

Related U.S. Application Data

(60) Provisional application No. 60/850,024, filed on Oct. 6, 2006.

(51) Int. Cl.
*G09G 3/34* (2006.01)
*F21V 8/00* (2006.01)
*G02B 26/00* (2006.01)

(52) U.S. Cl.
CPC ............ *G02B 6/0033* (2013.01); *G02B 6/0051* (2013.01); *G02B 26/001* (2013.01); *G02B 6/0056* (2013.01)

(58) Field of Classification Search
USPC ........................................................ 345/690
See application file for complete search history.

(56) References Cited

U.S. PATENT DOCUMENTS 2,518,647 A    8/1950  Teeple et al.
2,534,846 A    12/1950  Ambrose et al.
(Continued)

FOREIGN PATENT DOCUMENTS

CA    2 490 975    1/2004
CN    1158182 A    8/1997
(Continued)

OTHER PUBLICATIONS

Office Action for European Patent Application No. 07 838 811.3, dated Mar. 19, 2009.
(Continued)

*Primary Examiner* — Alexander Eisen
*Assistant Examiner* — Robin Mishler
(74) *Attorney, Agent, or Firm* — Knobbe, Martens, Olson & Bear, LLP

(57) ABSTRACT

Various embodiments of a display device described herein include an optical propagation region, at least one optical loss structure, an optical isolation layer, and a plurality of display elements. The propagation region includes a light guide in which light is guided via total internal reflection and turning features configured to redirect the light out of the propagation region. The loss structure would disrupt the total internal reflection of at least some of the light guided within the propagation region if disposed directly adjacent thereto. The optical isolation layer includes a non-gaseous material between the propagation region and the loss structure, and is configured to increase an amount of light that is totally internal reflected in the propagation region. The plurality of display elements are positioned to receive the light redirected out of the propagation region. The loss structure is positioned between the plurality of display elements and the propagation region.

38 Claims, 11 Drawing Sheets

(56) References Cited

U.S. PATENT DOCUMENTS

| | | |
|---|---|---|
| 2,677,714 A | 5/1954 | Auwarter |
| 3,247,392 A | 4/1966 | Thelen |
| 3,439,973 A | 4/1969 | Bernt et al. |
| 3,443,854 A | 5/1969 | Weiss |
| 3,448,334 A | 6/1969 | Frost |
| 3,653,741 A | 4/1972 | Marks |
| 3,656,836 A | 4/1972 | De Cremoux et al. |
| 3,679,313 A | 7/1972 | Rosenberg |
| 3,725,868 A | 4/1973 | Malmer et al. |
| 3,813,265 A | 5/1974 | Marks |
| 3,886,310 A | 5/1975 | Guldberg et al. |
| 3,924,929 A | 12/1975 | Holmen et al. |
| 3,955,880 A | 5/1976 | Lierke |
| 4,099,854 A | 7/1978 | Decker et al. |
| 4,200,472 A | 4/1980 | Chappell et al. |
| 4,228,437 A | 10/1980 | Shelton |
| 4,287,449 A | 9/1981 | Takeda et al. |
| 4,375,312 A | 3/1983 | Tangonan |
| 4,377,324 A | 3/1983 | Durand et al. |
| 4,378,567 A | 3/1983 | Mir |
| 4,389,096 A | 6/1983 | Hori et al. |
| 4,400,577 A | 8/1983 | Spear |
| 4,403,248 A | 9/1983 | Te Velde |
| 4,421,381 A | 12/1983 | Ueda et al. |
| 4,441,789 A | 4/1984 | Pohlack |
| 4,441,791 A | 4/1984 | Hornbeck |
| 4,445,050 A | 4/1984 | Marks |
| 4,459,182 A | 7/1984 | Te Velde |
| 4,519,676 A | 5/1985 | Te Velde |
| 4,531,126 A | 7/1985 | Sadones |
| 4,633,031 A | 12/1986 | Todorof |
| 4,663,083 A | 5/1987 | Marks |
| 4,681,403 A | 7/1987 | Te Velde et al. |
| 4,681,406 A | 7/1987 | Naito et al. |
| 4,748,366 A | 5/1988 | Taylor |
| 4,786,128 A | 11/1988 | Birnbach |
| 4,790,635 A | 12/1988 | Apsley |
| 4,832,459 A | 5/1989 | Harper |
| 4,850,682 A | 7/1989 | Gerritsen |
| 4,859,060 A | 8/1989 | Katagiri et al. |
| 4,863,224 A | 9/1989 | Afian et al. |
| 4,878,741 A | 11/1989 | Fergason |
| 4,915,479 A | 4/1990 | Clarke |
| 4,918,577 A | 4/1990 | Furudate |
| 4,947,291 A | 8/1990 | McDermott |
| 4,961,617 A | 10/1990 | Shahidi |
| 4,974,942 A | 12/1990 | Gross |
| 4,980,775 A | 12/1990 | Brody |
| 4,982,184 A | 1/1991 | Kirkwood |
| 5,022,745 A | 6/1991 | Zayhowski et al. |
| 5,037,173 A | 8/1991 | Sampsell et al. |
| 5,038,224 A | 8/1991 | Martulli et al. |
| 5,042,921 A | 8/1991 | Sato et al. |
| 5,044,736 A | 9/1991 | Jaskie et al. |
| 5,050,946 A | 9/1991 | Hathaway et al. |
| 5,075,796 A | 12/1991 | Schildkraut et al. |
| 5,110,370 A | 5/1992 | Vogeli et al. |
| 5,124,834 A | 6/1992 | Cusano et al. |
| 5,142,414 A | 8/1992 | Koehler |
| 5,151,585 A | 9/1992 | Siebert |
| 5,151,801 A | 9/1992 | Hiroshima |
| 5,153,771 A | 10/1992 | Link et al. |
| 5,164,858 A | 11/1992 | Aguilera, Jr. et al. |
| 5,168,406 A | 12/1992 | Nelson |
| 5,192,946 A | 3/1993 | Thompson et al. |
| 5,206,747 A | 4/1993 | Wiley et al. |
| 5,221,982 A | 6/1993 | Faris |
| 5,226,099 A | 7/1993 | Mignardi et al. |
| 5,231,532 A | 7/1993 | Magel et al. |
| 5,233,385 A | 8/1993 | Sampsell |
| 5,261,970 A | 11/1993 | Landis et al. |
| 5,272,496 A | 12/1993 | Nicolas et al. |
| 5,278,680 A | 1/1994 | Karasawa et al. |
| 5,283,600 A | 2/1994 | Imai |
| 5,287,215 A | 2/1994 | Warde et al. |
| 5,289,300 A | 2/1994 | Yamazaki |
| 5,291,314 A | 3/1994 | Agranat et al. |
| 5,293,272 A | 3/1994 | Jannson et al. |
| 5,311,360 A | 5/1994 | Bloom et al. |
| 5,326,426 A | 7/1994 | Tam et al. |
| 5,327,263 A | 7/1994 | Katagiri et al. |
| 5,339,179 A | 8/1994 | Rudisill |
| 5,341,242 A | 8/1994 | Gilboa et al. |
| 5,345,322 A | 9/1994 | Fergason |
| 5,356,488 A | 10/1994 | Hezel |
| 5,361,190 A | 11/1994 | Roberts et al. |
| 5,365,283 A | 11/1994 | Doherty et al. |
| 5,381,253 A | 1/1995 | Sharp et al. |
| 5,387,953 A | 2/1995 | Minoura et al. |
| 5,387,991 A | 2/1995 | Mitsutake et al. |
| 5,398,125 A | 3/1995 | Willett et al. |
| 5,398,170 A | 3/1995 | Lee |
| 5,401,983 A | 3/1995 | Jokerst et al. |
| 5,418,631 A | 5/1995 | Tedesco |
| 5,446,510 A | 8/1995 | Mitsutake et al. |
| 5,448,314 A | 9/1995 | Heimbuch et al. |
| 5,448,659 A | 9/1995 | Tsutsui et al. |
| 5,452,385 A | 9/1995 | Izumi et al. |
| 5,459,610 A | 10/1995 | Bloom et al. |
| 5,467,417 A | 11/1995 | Nakamura et al. |
| 5,474,865 A | 12/1995 | Vasudev |
| 5,481,385 A | 1/1996 | Zimmerman et al. |
| 5,497,172 A | 3/1996 | Doherty et al. |
| 5,500,635 A | 3/1996 | Mott |
| 5,500,761 A | 3/1996 | Goossen et al. |
| 5,515,184 A | 5/1996 | Caulfield |
| 5,517,347 A | 5/1996 | Sampsell |
| 5,517,366 A | 5/1996 | Togino |
| 5,550,373 A | 8/1996 | Cole et al. |
| 5,555,160 A | 9/1996 | Tawara et al. |
| 5,555,186 A | 9/1996 | Shioya |
| 5,579,149 A | 11/1996 | Moret et al. |
| 5,592,332 A | 1/1997 | Nishio et al. |
| 5,594,830 A | 1/1997 | Winston et al. |
| 5,601,351 A | 2/1997 | van den Brandt |
| 5,604,607 A | 2/1997 | Mirzaoff |
| 5,606,441 A | 2/1997 | Florence et al. |
| 5,615,024 A | 3/1997 | May et al. |
| 5,619,059 A | 4/1997 | Li et al. |
| 5,619,365 A | 4/1997 | Rhoads et al. |
| 5,619,366 A | 4/1997 | Rhoads et al. |
| 5,626,408 A | 5/1997 | Heynderickx et al. |
| 5,633,739 A | 5/1997 | Matsuyama et al. |
| 5,636,052 A | 6/1997 | Arney et al. |
| 5,638,084 A | 6/1997 | Kalt |
| 5,647,036 A | 7/1997 | Deacon |
| 5,650,865 A | 7/1997 | Smith |
| 5,659,410 A | 8/1997 | Koike et al. |
| 5,671,314 A | 9/1997 | Gregory et al. |
| 5,671,994 A | 9/1997 | Tai et al. |
| 5,673,128 A | 9/1997 | Ohta et al. |
| 5,703,667 A | 12/1997 | Ochiai |
| 5,703,710 A | 12/1997 | Brinkman et al. |
| 5,706,134 A | 1/1998 | Konno et al. |
| 5,710,656 A | 1/1998 | Goossen |
| 5,712,694 A | 1/1998 | Taira et al. |
| 5,731,857 A | 3/1998 | Neijzen |
| 5,735,590 A | 4/1998 | Kashima et al. |
| 5,739,945 A | 4/1998 | Tayebati |
| 5,745,281 A | 4/1998 | Yi et al. |
| 5,749,642 A | 5/1998 | Kimura et al. |
| 5,751,492 A | 5/1998 | Meyers |
| 5,754,260 A | 5/1998 | Ooi et al. |
| 5,771,124 A | 6/1998 | Kintz |
| 5,771,321 A | 6/1998 | Stern |
| 5,772,299 A | 6/1998 | Koo et al. |
| 5,782,993 A | 7/1998 | Ponewash |
| 5,782,995 A | 7/1998 | Nanya et al. |
| 5,783,614 A | 7/1998 | Chen |
| 5,805,117 A | 9/1998 | Mazurek |
| 5,808,708 A | 9/1998 | Oyama et al. |
| 5,810,464 A | 9/1998 | Ishikawa et al. |
| 5,815,229 A | 9/1998 | Shapiro |
| 5,816,677 A | 10/1998 | Kurematsu et al. |

(56) References Cited

U.S. PATENT DOCUMENTS

| | | |
|---|---|---|
| 5,818,095 A | 10/1998 | Sampsell |
| 5,835,256 A | 11/1998 | Huibers |
| 5,845,035 A | 12/1998 | Wimberger-Friedl |
| 5,853,240 A | 12/1998 | Tanaka et al. |
| 5,853,310 A | 12/1998 | Nishimura et al. |
| 5,854,872 A | 12/1998 | Tai |
| 5,868,480 A | 2/1999 | Zeinali |
| 5,877,874 A | 3/1999 | Rosenberg |
| 5,883,684 A | 3/1999 | Millikan et al. |
| 5,886,688 A | 3/1999 | Fifield et al. |
| 5,892,598 A | 4/1999 | Asakawa et al. |
| 5,894,359 A | 4/1999 | Suzuki et al. |
| 5,895,851 A | 4/1999 | Kano et al. |
| 5,913,594 A | 6/1999 | Iimura |
| 5,914,804 A | 6/1999 | Goossen |
| 5,920,417 A | 7/1999 | Johnson |
| 5,933,183 A | 8/1999 | Enomoto |
| 5,956,106 A | 9/1999 | Petersen et al. |
| 5,959,763 A | 9/1999 | Bozler et al. |
| 5,975,703 A | 11/1999 | Holman |
| 5,982,540 A | 11/1999 | Koike |
| 5,986,796 A | 11/1999 | Miles |
| 5,991,073 A | 11/1999 | Woodgate et al. |
| 5,999,239 A | 12/1999 | Larson |
| 6,002,829 A | 12/1999 | Winston |
| 6,008,449 A | 12/1999 | Cole |
| 6,014,192 A | 1/2000 | Lehureau |
| 6,023,373 A | 2/2000 | Inoguchi et al. |
| 6,028,649 A | 2/2000 | Faris et al. |
| 6,028,690 A | 2/2000 | Carter et al. |
| 6,031,653 A | 2/2000 | Wang |
| 6,040,937 A | 3/2000 | Miles |
| 6,046,840 A | 4/2000 | Huibers |
| 6,048,071 A | 4/2000 | Sawayama |
| 6,049,317 A | 4/2000 | Thompson et al. |
| 6,055,090 A | 4/2000 | Miles |
| 6,072,620 A | 6/2000 | Shiono et al. |
| 6,073,034 A | 6/2000 | Jacobsen et al. |
| 6,074,069 A | 6/2000 | Chao-Ching |
| 6,088,102 A | 7/2000 | Manhart |
| 6,088,941 A | 7/2000 | Inbar et al. |
| 6,091,469 A | 7/2000 | Naito |
| 6,094,285 A | 7/2000 | Wickham et al. |
| 6,099,134 A | 8/2000 | Taniguchi |
| 6,100,952 A | 8/2000 | Marvin et al. |
| 6,113,239 A | 9/2000 | Sampsell et al. |
| 6,128,077 A | 10/2000 | Jovin et al. |
| 6,147,728 A | 11/2000 | Okumura et al. |
| 6,151,089 A | 11/2000 | Yang et al. |
| 6,166,834 A | 12/2000 | Taketomi et al. |
| 6,167,761 B1 | 1/2001 | Hanzawa et al. |
| 6,195,196 B1 | 2/2001 | Kimura |
| 6,196,691 B1 | 3/2001 | Ochiai |
| 6,199,989 B1 | 3/2001 | Maeda et al. |
| 6,201,633 B1 | 3/2001 | Peeters et al. |
| 6,208,466 B1 * | 3/2001 | Liu et al. ...................... 359/584 |
| 6,211,976 B1 | 4/2001 | Popovich |
| 6,213,606 B1 | 4/2001 | Holman |
| 6,232,937 B1 | 5/2001 | Jacobsen et al. |
| 6,243,149 B1 | 6/2001 | Swanson et al. |
| 6,259,082 B1 | 7/2001 | Fujimoto et al. |
| 6,273,577 B1 | 8/2001 | Goto et al. |
| 6,282,010 B1 | 8/2001 | Sulzbach |
| 6,283,602 B1 | 9/2001 | Kawaguchi et al. |
| 6,285,424 B1 | 9/2001 | Yoshida |
| 6,288,824 B1 | 9/2001 | Kastalsky |
| 6,292,504 B1 | 9/2001 | Halmos |
| 6,300,558 B1 | 10/2001 | Takamoto et al. |
| 6,301,000 B1 | 10/2001 | Johnson |
| 6,301,026 B1 | 10/2001 | Ueda |
| 6,322,236 B1 | 11/2001 | Campbell et al. |
| 6,323,415 B1 | 11/2001 | Uematsu et al. |
| 6,323,892 B1 | 11/2001 | Mihara |
| 6,323,923 B1 | 11/2001 | Hoshino et al. |
| 6,323,987 B1 | 11/2001 | Rinaudo et al. |
| 6,342,970 B1 | 1/2002 | Sperger et al. |
| 6,356,378 B1 | 3/2002 | Huibers |
| 6,359,668 B1 | 3/2002 | Iijima et al. |
| 6,368,885 B1 | 4/2002 | Offenberg et al. |
| 6,371,623 B1 | 4/2002 | Toyoda |
| 6,375,327 B2 | 4/2002 | Holman |
| 6,377,233 B2 | 4/2002 | Colgan et al. |
| 6,377,535 B1 | 4/2002 | Chen et al. |
| 6,381,022 B1 | 4/2002 | Zavracky |
| 6,399,257 B1 | 6/2002 | Shirota et al. |
| 6,400,738 B1 | 6/2002 | Tucker et al. |
| 6,402,325 B1 | 6/2002 | Yamamoto |
| 6,407,785 B1 | 6/2002 | Yamazaki |
| 6,411,423 B2 | 6/2002 | Ham |
| 6,412,969 B1 | 7/2002 | Torihara et al. |
| 6,421,103 B2 | 7/2002 | Yamaguchi |
| 6,431,716 B1 | 8/2002 | Kusakabe |
| 6,442,124 B1 | 8/2002 | Chung et al. |
| 6,448,709 B1 | 9/2002 | Chuang et al. |
| 6,454,452 B1 | 9/2002 | Sasagawa |
| 6,456,279 B1 | 9/2002 | Kubo et al. |
| 6,466,354 B1 | 10/2002 | Gudeman |
| 6,466,358 B2 | 10/2002 | Tew |
| 6,470,115 B1 | 10/2002 | Yonekubo |
| 6,478,432 B1 | 11/2002 | Dyner |
| 6,480,634 B1 | 11/2002 | Corrigan |
| 6,483,613 B1 | 11/2002 | Woodgate et al. |
| 6,493,475 B1 | 12/2002 | Lin |
| 6,494,588 B1 | 12/2002 | Okada |
| 6,504,589 B1 | 1/2003 | Kashima et al. |
| 6,512,626 B1 | 1/2003 | Schmidt |
| 6,518,944 B1 | 2/2003 | Doane et al. |
| 6,519,073 B1 | 2/2003 | Goossen |
| 6,520,643 B1 | 2/2003 | Holman et al. |
| 6,522,373 B1 | 2/2003 | Hira et al. |
| 6,522,792 B1 | 2/2003 | Sugamata et al. |
| 6,522,794 B1 | 2/2003 | Bischel |
| 6,527,410 B2 | 3/2003 | Yamaguchi |
| 6,538,813 B1 | 3/2003 | Magno |
| 6,540,368 B2 | 4/2003 | Akaoka |
| 6,545,734 B2 | 4/2003 | Cornelissen et al. |
| 6,549,338 B1 | 4/2003 | Wolverton et al. |
| 6,561,661 B2 | 5/2003 | Egawa |
| 6,565,225 B2 | 5/2003 | Mabuchi et al. |
| 6,574,033 B1 | 6/2003 | Chui |
| 6,577,429 B1 | 6/2003 | Kurtz |
| 6,580,496 B2 | 6/2003 | Bamji et al. |
| 6,582,095 B1 | 6/2003 | Toyoda |
| 6,592,234 B2 | 7/2003 | Epstein |
| 6,597,419 B1 | 7/2003 | Okada et al. |
| 6,597,490 B2 | 7/2003 | Tayebati |
| 6,598,987 B1 | 7/2003 | Parikka |
| 6,603,520 B2 | 8/2003 | Umemoto |
| 6,624,944 B1 | 9/2003 | Wallace et al. |
| 6,630,786 B2 | 10/2003 | Cummings et al. |
| 6,630,968 B1 | 10/2003 | Tsuchihashi et al. |
| 6,631,998 B2 | 10/2003 | Egawa et al. |
| 6,636,283 B2 | 10/2003 | Sasagawa et al. |
| 6,636,322 B1 | 10/2003 | Terashita |
| 6,636,358 B2 | 10/2003 | Umemoto et al. |
| 6,636,653 B2 | 10/2003 | Miracky et al. |
| 6,642,913 B1 | 11/2003 | Kimura |
| 6,642,976 B2 | 11/2003 | Umemoto et al. |
| 6,643,067 B2 | 11/2003 | Miyamae |
| 6,643,069 B2 | 11/2003 | Dewald |
| 6,646,772 B1 | 11/2003 | Popovich et al. |
| 6,650,455 B2 | 11/2003 | Miles |
| 6,652,109 B2 | 11/2003 | Nakamura |
| 6,655,820 B2 | 12/2003 | Jung et al. |
| 6,657,683 B2 | 12/2003 | Richard |
| 6,657,700 B2 | 12/2003 | Sako et al. |
| 6,659,615 B2 | 12/2003 | Umemoto |
| 6,660,997 B2 | 12/2003 | Laberge et al. |
| 6,667,782 B1 | 12/2003 | Taira et al. |
| 6,669,350 B2 | 12/2003 | Yamashita |
| 6,674,562 B1 | 1/2004 | Miles |
| 6,677,709 B1 | 1/2004 | Ma et al. |
| 6,680,792 B2 | 1/2004 | Miles |
| 6,683,693 B1 | 1/2004 | O Tsuka et al. |

(56) References Cited

U.S. PATENT DOCUMENTS

| | | |
|---|---|---|
| 6,687,040 B2 | 2/2004 | Kimura |
| 6,693,690 B2 | 2/2004 | Umemoto |
| 6,696,140 B2 | 2/2004 | Suzuki |
| 6,706,339 B1 | 3/2004 | Miyatake et al. |
| 6,709,123 B2 | 3/2004 | Flohr |
| 6,738,194 B1 | 5/2004 | Ramirez |
| 6,742,907 B2 | 6/2004 | Funamoto et al. |
| 6,742,921 B2 | 6/2004 | Umemoto |
| 6,747,801 B2 | 6/2004 | Umemoto |
| 6,751,023 B2 | 6/2004 | Umemoto et al. |
| 6,760,135 B1 | 7/2004 | Payne |
| 6,760,146 B2 | 7/2004 | Ikeda et al. |
| 6,761,461 B2 | 7/2004 | Mizutani et al. |
| 6,768,555 B2 | 7/2004 | Chen et al. |
| 6,773,126 B1 | 8/2004 | Hatjasalo |
| 6,774,962 B2 | 8/2004 | Yoon |
| 6,778,746 B2 | 8/2004 | Charlton et al. |
| 6,784,948 B2 | 8/2004 | Kawashima et al. |
| 6,792,293 B1 | 9/2004 | Awan et al. |
| 6,794,119 B2 | 9/2004 | Miles |
| 6,806,924 B2 | 10/2004 | Niiyama et al. |
| 6,811,267 B1 | 11/2004 | Allen et al. |
| 6,819,380 B2 | 11/2004 | Wen et al. |
| 6,822,745 B2 | 11/2004 | De Groot et al. |
| 6,822,780 B1 | 11/2004 | Long, Jr. |
| 6,825,895 B2 | 11/2004 | Nakano et al. |
| 6,826,000 B2 | 11/2004 | Lee et al. |
| 6,829,258 B1 | 12/2004 | Carlisle et al. |
| 6,841,787 B2 | 1/2005 | Almogy |
| 6,844,953 B2 | 1/2005 | Reboa |
| 6,844,959 B2 | 1/2005 | Huibers et al. |
| 6,852,396 B1 | 2/2005 | Mineo |
| 6,861,121 B2 | 3/2005 | Matsunaga et al. |
| 6,862,141 B2 | 3/2005 | Olczak |
| 6,863,428 B2 | 3/2005 | Lundin |
| 6,864,882 B2 | 3/2005 | Newton |
| 6,865,312 B2 | 3/2005 | Niv et al. |
| 6,866,393 B2 | 3/2005 | Yano et al. |
| 6,867,896 B2 | 3/2005 | Miles |
| 6,870,581 B2 | 3/2005 | Li et al. |
| 6,871,982 B2 | 3/2005 | Holman et al. |
| 6,879,354 B1 | 4/2005 | Sawayama et al. |
| 6,880,959 B2 | 4/2005 | Houston |
| 6,882,421 B2 | 4/2005 | Opsal et al. |
| 6,882,458 B2 | 4/2005 | Lin et al. |
| 6,882,461 B1 | 4/2005 | Tsai et al. |
| 6,883,924 B2 | 4/2005 | Maeda et al. |
| 6,883,934 B2 | 4/2005 | Kawakami et al. |
| 6,885,377 B2 | 4/2005 | Lim |
| 6,891,530 B2 | 5/2005 | Umemoto |
| 6,897,855 B1 | 5/2005 | Matthies et al. |
| 6,897,923 B2 | 5/2005 | Kanesaka et al. |
| 6,912,022 B2 | 6/2005 | Lin et al. |
| 6,917,469 B2 | 7/2005 | Momose |
| 6,930,816 B2 | 8/2005 | Mochizuki |
| 6,951,401 B2 | 10/2005 | Van Hees et al. |
| 6,961,045 B2 | 11/2005 | Tsao |
| 6,964,484 B2 | 11/2005 | Gupta |
| 6,967,779 B2 | 11/2005 | Fadel et al. |
| 6,970,031 B1 | 11/2005 | Martin |
| 6,972,827 B2 | 12/2005 | Mi |
| 6,982,820 B2 | 1/2006 | Tsai |
| 6,995,890 B2 | 2/2006 | Lin |
| 6,998,196 B2 | 2/2006 | Rich et al. |
| 6,999,225 B2 | 2/2006 | Lin et al. |
| 6,999,235 B2 | 2/2006 | Nakamura |
| 6,999,236 B2 | 2/2006 | Lin et al. |
| 7,002,726 B2 | 2/2006 | Patel |
| 7,004,610 B2 | 2/2006 | Yamashita |
| 7,006,272 B2 | 2/2006 | Tsai |
| 7,009,754 B2 | 3/2006 | Huibers |
| 7,010,212 B2 | 3/2006 | Emmons et al. |
| 7,012,659 B2 | 3/2006 | Smith et al. |
| 7,016,095 B2 | 3/2006 | Lin |
| 7,018,088 B2 | 3/2006 | Yu et al. |
| 7,019,734 B2 | 3/2006 | Cross et al. |
| 7,025,461 B2 | 4/2006 | Veligdan et al. |
| 7,030,949 B2 | 4/2006 | Kashima |
| 7,034,981 B2 | 4/2006 | Makigaki |
| 7,038,752 B2 | 5/2006 | Lin |
| 7,041,344 B2 | 5/2006 | Kusume et al. |
| 7,042,444 B2 | 5/2006 | Cok |
| 7,042,643 B2 | 5/2006 | Miles |
| 7,046,409 B2 | 5/2006 | Kihara |
| 7,050,219 B2 | 5/2006 | Kimura |
| 7,054,045 B2 | 5/2006 | McPheters et al. |
| 7,056,001 B2 | 6/2006 | Chuang |
| 7,061,226 B2 | 6/2006 | Durr |
| 7,064,875 B2 | 6/2006 | Kawano |
| 7,068,948 B2 | 6/2006 | Wei et al. |
| 7,072,093 B2 | 7/2006 | Piehl |
| 7,072,096 B2 | 7/2006 | Holman et al. |
| 7,092,163 B2 | 8/2006 | Bastawros et al. |
| 7,099,058 B2 | 8/2006 | Takemori et al. |
| 7,110,158 B2 | 9/2006 | Miles |
| 7,113,339 B2 | 9/2006 | Taguchi et al. |
| 7,123,216 B1 | 10/2006 | Miles |
| 7,126,738 B2 | 10/2006 | Miles |
| 7,128,459 B2 | 10/2006 | Igarashi et al. |
| 7,130,104 B2 | 10/2006 | Cummings |
| 7,133,022 B2 | 11/2006 | Grabert |
| 7,136,213 B2 | 11/2006 | Chui |
| 7,138,984 B1 | 11/2006 | Miles |
| 7,142,346 B2 | 11/2006 | Chui et al. |
| 7,142,347 B2 | 11/2006 | Islam |
| 7,156,546 B2 | 1/2007 | Higashiyama |
| 7,161,136 B1 | 1/2007 | Wenstrand et al. |
| 7,161,728 B2 | 1/2007 | Sampsell et al. |
| 7,161,730 B2 | 1/2007 | Floyd |
| 7,172,915 B2 | 2/2007 | Lin et al. |
| 7,180,672 B2 | 2/2007 | Olczak |
| 7,187,489 B2 | 3/2007 | Miles |
| 7,206,133 B2 | 4/2007 | Cassarly et al. |
| 7,210,806 B2 | 5/2007 | Holman |
| 7,212,345 B2 | 5/2007 | Wilson |
| 7,218,429 B2 | 5/2007 | Batchko |
| 7,218,812 B2 | 5/2007 | Maxwell et al. |
| 7,221,418 B2 | 5/2007 | Lee et al. |
| 7,223,010 B2 | 5/2007 | Min et al. |
| 7,236,663 B2 | 6/2007 | Wakita et al. |
| 7,256,922 B2 | 8/2007 | Chui et al. |
| 7,262,754 B1 | 8/2007 | Yamazaki |
| 7,262,916 B2 | 8/2007 | Kao et al. |
| 7,264,389 B2 | 9/2007 | Sado et al. |
| 7,304,784 B2 | 12/2007 | Chui et al. |
| 7,324,248 B2 | 1/2008 | Brotherton-Ratcliffe et al. |
| 7,324,284 B2 | 1/2008 | Olczak |
| 7,327,510 B2 | 2/2008 | Cummings et al. |
| 7,335,780 B2 | 2/2008 | Annis |
| 7,336,329 B2 | 2/2008 | Yoon |
| 7,342,705 B2 | 3/2008 | Chui et al. |
| 7,342,709 B2 | 3/2008 | Lin |
| 7,349,139 B2 | 3/2008 | Chui et al. |
| 7,349,141 B2 | 3/2008 | Tung et al. |
| 7,352,501 B2 | 4/2008 | Chopra et al. |
| 7,352,940 B2 | 4/2008 | Charters et al. |
| 7,355,780 B2 | 4/2008 | Chui |
| 7,357,552 B2 | 4/2008 | Takada |
| 7,357,557 B2 | 4/2008 | Miyashita |
| 7,359,011 B2 | 4/2008 | Hamada |
| 7,360,899 B2 | 4/2008 | McGuire |
| 7,366,393 B2 | 4/2008 | Cassarly |
| 7,369,292 B2 | 5/2008 | Xu et al. |
| 7,369,294 B2 | 5/2008 | Gally |
| 7,372,449 B2 | 5/2008 | Kodama et al. |
| 7,372,631 B2 | 5/2008 | Ozawa |
| 7,374,327 B2 | 5/2008 | Schexnaider |
| 7,375,779 B2 | 5/2008 | Lee et al. |
| 7,376,308 B2 | 5/2008 | Cheben et al. |
| 7,377,678 B2 | 5/2008 | Huang et al. |
| 7,380,969 B2 | 6/2008 | Yamashita et al. |
| 7,380,970 B2 | 6/2008 | Hwang et al. |
| 7,385,748 B2 | 6/2008 | Miles |
| 7,388,181 B2 | 6/2008 | Han et al. |

(56) References Cited

U.S. PATENT DOCUMENTS

| | | |
|---|---|---|
| 7,388,706 B2 | 6/2008 | Miles |
| 7,400,439 B2 | 7/2008 | Holman |
| 7,403,180 B1 | 7/2008 | Silverstein et al. |
| 7,417,735 B2 | 8/2008 | Cummings |
| 7,417,784 B2 | 8/2008 | Sasagawa |
| 7,420,638 B2 | 9/2008 | Tasaka et al. |
| 7,420,725 B2 | 9/2008 | Kothari |
| 7,450,295 B2 | 11/2008 | Tung |
| 7,456,805 B2 | 11/2008 | Ouderkirk |
| 7,463,421 B2 | 12/2008 | Miles |
| 7,477,809 B1 | 1/2009 | Tan et al. |
| 7,494,830 B2 | 2/2009 | Liu et al. |
| 7,498,621 B2 | 3/2009 | Seitz |
| 7,502,081 B2 | 3/2009 | Umemoto et al. |
| 7,508,571 B2 | 3/2009 | Gally |
| 7,515,336 B2 | 4/2009 | Lippey |
| 7,520,642 B2 | 4/2009 | Holman et al. |
| 7,532,800 B2 | 5/2009 | Iimura |
| 7,545,569 B2 | 6/2009 | Cassarly |
| 7,557,935 B2 | 7/2009 | Baruch |
| 7,561,323 B2 | 7/2009 | Gally |
| 7,564,612 B2 | 7/2009 | Chui |
| 7,603,001 B2 | 10/2009 | Wang |
| 7,630,123 B2 | 12/2009 | Kothari |
| 7,643,203 B2 | 1/2010 | Gousev et al. |
| 7,663,714 B2 | 2/2010 | Haga et al. |
| 7,684,126 B2 | 3/2010 | Eckhardt |
| 7,688,494 B2 | 3/2010 | Xu et al. |
| 7,692,844 B2 | 4/2010 | Miles |
| 7,701,029 B2 | 4/2010 | Mabuchi |
| 7,706,050 B2 | 4/2010 | Sampsell |
| 7,710,632 B2 | 5/2010 | Cummings |
| 7,710,636 B2 | 5/2010 | Chui |
| 7,719,500 B2 | 5/2010 | Chui |
| 7,719,747 B2 | 5/2010 | Tung et al. |
| 7,733,439 B2 | 6/2010 | Sampsell |
| 7,750,886 B2 | 7/2010 | Sampsell |
| 7,766,498 B2 | 8/2010 | Sampsell |
| 7,766,531 B2 | 8/2010 | Anderson et al. |
| 7,768,690 B2 | 8/2010 | Sampsell |
| 7,777,954 B2 | 8/2010 | Gruhlke |
| 7,807,488 B2 | 10/2010 | Gally |
| 7,813,026 B2 | 10/2010 | Sampsell |
| 7,813,029 B2 | 10/2010 | Kothari et al. |
| 7,843,061 B2 | 11/2010 | Poli et al. |
| 7,845,841 B2 | 12/2010 | Sampsell |
| 7,848,001 B2 | 12/2010 | Miles |
| 7,855,824 B2 | 12/2010 | Gally |
| 7,855,827 B2 | 12/2010 | Xu et al. |
| 7,864,395 B2 | 1/2011 | Chui |
| 7,872,394 B1 | 1/2011 | Gritters et al. |
| 7,876,397 B2 | 1/2011 | Krijn et al. |
| 7,880,954 B2 | 2/2011 | Sampsell |
| 7,898,521 B2 | 3/2011 | Gally et al. |
| 7,907,319 B2 | 3/2011 | Miles |
| 7,911,428 B2 | 3/2011 | Gally et al. |
| 7,916,378 B2 | 3/2011 | Wang |
| 7,928,928 B2 | 4/2011 | Gally et al. |
| 7,933,475 B2 | 4/2011 | Wang |
| 7,944,602 B2 | 5/2011 | Chui |
| 7,949,213 B2 | 5/2011 | Mienko et al. |
| 7,986,451 B2 | 7/2011 | Gally |
| 8,061,882 B2 | 11/2011 | Bita et al. |
| 8,068,710 B2 | 11/2011 | Bita et al. |
| 8,169,689 B2 | 5/2012 | Sampsell |
| 8,408,775 B1 | 4/2013 | Coleman |
| 2001/0003487 A1 | 6/2001 | Miles |
| 2001/0003504 A1 | 6/2001 | Ishihara et al. |
| 2001/0010952 A1 | 8/2001 | Abramovich |
| 2001/0019240 A1 | 9/2001 | Takahashi |
| 2001/0019380 A1 | 9/2001 | Ishihara |
| 2001/0019479 A1 | 9/2001 | Nakabayashi |
| 2001/0022636 A1 | 9/2001 | Yang et al. |
| 2001/0026001 A1 | 10/2001 | Yagi |
| 2001/0030861 A1 | 10/2001 | Oda et al. |
| 2001/0049061 A1 | 12/2001 | Nakagaki |
| 2001/0055076 A1 | 12/2001 | Ochi et al. |
| 2001/0055208 A1 | 12/2001 | Kimura |
| 2002/0006036 A1 | 1/2002 | Egawa et al. |
| 2002/0015314 A1 | 2/2002 | Umemoto et al. |
| 2002/0034071 A1 | 3/2002 | Mabuchi |
| 2002/0039155 A1 | 4/2002 | Umemoto |
| 2002/0044445 A1 | 4/2002 | Bohler et al. |
| 2002/0050286 A1 | 5/2002 | Kubota |
| 2002/0050764 A1 | 5/2002 | Koga et al. |
| 2002/0051103 A1 | 5/2002 | Faris et al. |
| 2002/0054258 A1 | 5/2002 | Kondo |
| 2002/0057399 A1 | 5/2002 | Ishitaka |
| 2002/0060907 A1 | 5/2002 | Saccomanno |
| 2002/0075245 A1 | 6/2002 | Kawashima |
| 2002/0075555 A1 | 6/2002 | Miles |
| 2002/0080465 A1 | 6/2002 | Han |
| 2002/0081089 A1 | 6/2002 | Min et al. |
| 2002/0106182 A1 | 8/2002 | Kawashima |
| 2002/0131151 A1 | 9/2002 | Engler et al. |
| 2002/0149584 A1 | 10/2002 | Simpson |
| 2002/0153486 A1 | 10/2002 | Ishizuya et al. |
| 2002/0154256 A1 | 10/2002 | Gotoh et al. |
| 2002/0167730 A1 | 11/2002 | Needham et al. |
| 2002/0172039 A1 | 11/2002 | Inditsky |
| 2002/0172810 A1 | 11/2002 | Murata et al. |
| 2002/0176035 A1 | 11/2002 | Yamazaki |
| 2003/0001985 A1 | 1/2003 | Doe |
| 2003/0006730 A1 | 1/2003 | Tachibana |
| 2003/0011864 A1 | 1/2003 | Flanders |
| 2003/0012009 A1 | 1/2003 | Suzuki et al. |
| 2003/0016930 A1 | 1/2003 | Inditsky |
| 2003/0030764 A1 | 2/2003 | Lee |
| 2003/0058069 A1 | 3/2003 | Schwartz et al. |
| 2003/0067760 A1 | 4/2003 | Jagt et al. |
| 2003/0071947 A1 | 4/2003 | Shiraogawa et al. |
| 2003/0081154 A1 | 5/2003 | Coleman et al. |
| 2003/0083429 A1 | 5/2003 | Smith |
| 2003/0086030 A1 | 5/2003 | Taniguchi |
| 2003/0086031 A1 | 5/2003 | Taniguchi et al. |
| 2003/0095401 A1 | 5/2003 | Hanson |
| 2003/0098957 A1 | 5/2003 | Haldiman |
| 2003/0099118 A1 | 5/2003 | Saitoh |
| 2003/0103177 A1 | 6/2003 | Maeda et al. |
| 2003/0103344 A1 | 6/2003 | Niida et al. |
| 2003/0107692 A1 | 6/2003 | Sekiguchi |
| 2003/0123245 A1 | 7/2003 | Parker et al. |
| 2003/0136759 A1 | 7/2003 | Mikolas |
| 2003/0137617 A1 | 7/2003 | Cornelissen et al. |
| 2003/0142247 A1 | 7/2003 | Nishiyama et al. |
| 2003/0151821 A1 | 8/2003 | Favalora |
| 2003/0160919 A1 | 8/2003 | Suzuki |
| 2003/0161040 A1 | 8/2003 | Ishii |
| 2003/0165067 A1 | 9/2003 | Imamura et al. |
| 2003/0169385 A1 | 9/2003 | Okuwaki |
| 2003/0169386 A1 | 9/2003 | Goto et al. |
| 2003/0184690 A1 | 10/2003 | Ogiwara |
| 2003/0184989 A1 | 10/2003 | Matsumoto et al. |
| 2003/0193630 A1 | 10/2003 | Chiou |
| 2003/0206281 A1 | 11/2003 | Jain |
| 2003/0210222 A1 | 11/2003 | Ogiwara et al. |
| 2003/0210363 A1 | 11/2003 | Yasukawa |
| 2003/0210366 A1 | 11/2003 | Huang et al. |
| 2003/0210367 A1 | 11/2003 | Nakano et al. |
| 2003/0213514 A1 | 11/2003 | Ortabasi |
| 2003/0214621 A1 | 11/2003 | Kim et al. |
| 2003/0214728 A1 | 11/2003 | Olczak |
| 2003/0222857 A1 | 12/2003 | Abileah |
| 2003/0222980 A1 | 12/2003 | Miyagaki et al. |
| 2003/0231483 A1 | 12/2003 | Higashiyama |
| 2004/0001169 A1 | 1/2004 | Saiki et al. |
| 2004/0017599 A1 | 1/2004 | Yang |
| 2004/0027315 A1 | 2/2004 | Senda et al. |
| 2004/0027339 A1 | 2/2004 | Schulz |
| 2004/0032401 A1 | 2/2004 | Nakazawa |
| 2004/0032659 A1 | 2/2004 | Drinkwater |
| 2004/0042233 A1 | 3/2004 | Suzuki et al. |
| 2004/0051929 A1 | 3/2004 | Sampsell et al. |
| 2004/0061946 A1 | 4/2004 | Yoshikawa et al. |

(56) References Cited

U.S. PATENT DOCUMENTS

| | | |
|---|---|---|
| 2004/0066477 A1 | 4/2004 | Morimoto et al. |
| 2004/0070711 A1 | 4/2004 | Wen |
| 2004/0071937 A1 | 4/2004 | Chien et al. |
| 2004/0080807 A1 | 4/2004 | Chen et al. |
| 2004/0085748 A1 | 5/2004 | Sugiura |
| 2004/0100796 A1 | 5/2004 | Ward |
| 2004/0109303 A1 | 6/2004 | Olczak |
| 2004/0109305 A1 | 6/2004 | Chisholm |
| 2004/0114242 A1 | 6/2004 | Sharp |
| 2004/0115339 A1 | 6/2004 | Ito |
| 2004/0125048 A1 | 7/2004 | Fukuda et al. |
| 2004/0135494 A1 | 7/2004 | Miyatake |
| 2004/0170373 A1 | 9/2004 | Kim |
| 2004/0174583 A1 | 9/2004 | Chen et al. |
| 2004/0175577 A1 | 9/2004 | Lin et al. |
| 2004/0188150 A1 | 9/2004 | Richard et al. |
| 2004/0188599 A1 | 9/2004 | Viktorovitch |
| 2004/0207605 A1 | 10/2004 | Mackey et al. |
| 2004/0207995 A1 | 10/2004 | Park et al. |
| 2004/0217264 A1 | 11/2004 | Wood et al. |
| 2004/0217919 A1 | 11/2004 | Piehl et al. |
| 2004/0228109 A1 | 11/2004 | Leu et al. |
| 2004/0228112 A1 | 11/2004 | Takata |
| 2004/0233357 A1 | 11/2004 | Fujimori |
| 2004/0246743 A1 | 12/2004 | Lee |
| 2004/0248524 A1 | 12/2004 | Flegeo |
| 2005/0002082 A1 | 1/2005 | Miles |
| 2005/0002175 A1 | 1/2005 | Matsui et al. |
| 2005/0010568 A1 | 1/2005 | Nagatomo |
| 2005/0024849 A1 | 2/2005 | Parker |
| 2005/0024890 A1 | 2/2005 | Yamamoto et al. |
| 2005/0035699 A1 | 2/2005 | Tsai |
| 2005/0036095 A1 | 2/2005 | Yeh et al. |
| 2005/0041175 A1 | 2/2005 | Akiyama |
| 2005/0042117 A1 | 2/2005 | Lin |
| 2005/0046011 A1 | 3/2005 | Chen et al. |
| 2005/0057442 A1 | 3/2005 | Way |
| 2005/0069209 A1 | 3/2005 | Damera-Venkata et al. |
| 2005/0069254 A1 | 3/2005 | Schultheis |
| 2005/0073507 A1 | 4/2005 | Richter et al. |
| 2005/0088719 A1 | 4/2005 | Patel et al. |
| 2005/0099792 A1 | 5/2005 | Matsui et al. |
| 2005/0101059 A1 | 5/2005 | Yang et al. |
| 2005/0117088 A1 | 6/2005 | Van Der Wel |
| 2005/0117623 A1 | 6/2005 | Shchukin et al. |
| 2005/0120553 A1 | 6/2005 | Brown |
| 2005/0133761 A1 | 6/2005 | Thielemans |
| 2005/0141065 A1 | 6/2005 | Masamoto |
| 2005/0146897 A1 | 7/2005 | Mimura |
| 2005/0180145 A1 | 8/2005 | Okuwaki |
| 2005/0195175 A1 | 9/2005 | Anderson |
| 2005/0195370 A1 | 9/2005 | Gore et al. |
| 2005/0195462 A1 | 9/2005 | Lin |
| 2005/0206802 A1 | 9/2005 | Creemers |
| 2005/0207016 A1 | 9/2005 | Ando |
| 2005/0213346 A1 | 9/2005 | Kao et al. |
| 2005/0224694 A1 | 10/2005 | Yaung |
| 2005/0225686 A1 | 10/2005 | Brummack et al. |
| 2005/0231977 A1 | 10/2005 | Hayakawa |
| 2005/0231981 A1 | 10/2005 | Hoelen et al. |
| 2005/0242693 A1 | 11/2005 | Hayashi et al. |
| 2005/0248524 A1 | 11/2005 | Feng et al. |
| 2005/0248698 A1 | 11/2005 | Okamoto et al. |
| 2005/0259302 A9 | 11/2005 | Metz et al. |
| 2005/0259939 A1 | 11/2005 | Rinko |
| 2005/0271325 A1 | 12/2005 | Anderson et al. |
| 2006/0002141 A1 | 1/2006 | Ouderkirk et al. |
| 2006/0002655 A1 | 1/2006 | Smits |
| 2006/0002675 A1 | 1/2006 | Choi |
| 2006/0007510 A1 | 1/2006 | Nishide et al. |
| 2006/0012733 A1 | 1/2006 | Jin et al. |
| 2006/0012739 A1 | 1/2006 | Shibazaki |
| 2006/0022966 A1 | 2/2006 | Mar |
| 2006/0024017 A1 | 2/2006 | Page et al. |
| 2006/0024880 A1 | 2/2006 | Chui et al. |
| 2006/0044523 A1 | 3/2006 | Teijido et al. |
| 2006/0044928 A1 | 3/2006 | Chui et al. |
| 2006/0050032 A1 | 3/2006 | Gunner et al. |
| 2006/0051048 A1 | 3/2006 | Gardiner et al. |
| 2006/0056000 A1 | 3/2006 | Mignard |
| 2006/0056166 A1 | 3/2006 | Yeo et al. |
| 2006/0061705 A1 | 3/2006 | Onishi |
| 2006/0062016 A1 | 3/2006 | Dejima et al. |
| 2006/0065940 A1 | 3/2006 | Kothari |
| 2006/0066503 A1 | 3/2006 | Sampsell et al. |
| 2006/0066504 A1 | 3/2006 | Sampsell et al. |
| 2006/0066557 A1 | 3/2006 | Floyd |
| 2006/0066560 A1 | 3/2006 | Gally et al. |
| 2006/0066586 A1 | 3/2006 | Gally |
| 2006/0066595 A1 | 3/2006 | Sampsell et al. |
| 2006/0066596 A1 | 3/2006 | Sampsell et al. |
| 2006/0066598 A1 | 3/2006 | Floyd |
| 2006/0066600 A1 | 3/2006 | Palmateer |
| 2006/0066601 A1 | 3/2006 | Kothari et al. |
| 2006/0066641 A1 * | 3/2006 | Gally et al. .................. 345/690 |
| 2006/0066863 A1 | 3/2006 | Cummings et al. |
| 2006/0066936 A1 | 3/2006 | Chui et al. |
| 2006/0066937 A1 | 3/2006 | Chui |
| 2006/0066938 A1 | 3/2006 | Chui |
| 2006/0067028 A1 | 3/2006 | Floyd |
| 2006/0072315 A1 | 4/2006 | Han et al. |
| 2006/0072339 A1 | 4/2006 | Li et al. |
| 2006/0073623 A1 | 4/2006 | Conley, Jr. et al. |
| 2006/0076631 A1 | 4/2006 | Palmateer et al. |
| 2006/0076632 A1 | 4/2006 | Palmateer et al. |
| 2006/0077123 A1 | 4/2006 | Gally |
| 2006/0077124 A1 | 4/2006 | Gally |
| 2006/0077126 A1 | 4/2006 | Kothari |
| 2006/0077127 A1 | 4/2006 | Sampsell et al. |
| 2006/0077146 A1 | 4/2006 | Palmateer |
| 2006/0077148 A1 | 4/2006 | Gally et al. |
| 2006/0077149 A1 | 4/2006 | Gally et al. |
| 2006/0077504 A1 | 4/2006 | Floyd |
| 2006/0077505 A1 | 4/2006 | Chui et al. |
| 2006/0077518 A1 | 4/2006 | Chui et al. |
| 2006/0077520 A1 | 4/2006 | Chui et al. |
| 2006/0077521 A1 | 4/2006 | Gally et al. |
| 2006/0077523 A1 | 4/2006 | Cummings et al. |
| 2006/0077524 A1 | 4/2006 | Palmateer |
| 2006/0077528 A1 | 4/2006 | Floyd |
| 2006/0077529 A1 | 4/2006 | Chui et al. |
| 2006/0077533 A1 | 4/2006 | Miles et al. |
| 2006/0077617 A1 | 4/2006 | Floyd |
| 2006/0079048 A1 | 4/2006 | Sampsell |
| 2006/0083028 A1 | 4/2006 | Sun et al. |
| 2006/0091824 A1 | 5/2006 | Pate et al. |
| 2006/0103613 A1 | 5/2006 | Chui |
| 2006/0103643 A1 | 5/2006 | Mathew et al. |
| 2006/0103912 A1 | 5/2006 | Katoh et al. |
| 2006/0109682 A1 | 5/2006 | Ko et al. |
| 2006/0109686 A1 | 5/2006 | Sugiura |
| 2006/0110090 A1 | 5/2006 | Ellwood, Jr. |
| 2006/0114244 A1 | 6/2006 | Saxena et al. |
| 2006/0126142 A1 | 6/2006 | Choi |
| 2006/0130889 A1 | 6/2006 | Li et al. |
| 2006/0132383 A1 | 6/2006 | Gally |
| 2006/0164861 A1 | 7/2006 | Maeda et al. |
| 2006/0176241 A1 | 8/2006 | Sampsell |
| 2006/0176487 A1 | 8/2006 | Cummings et al. |
| 2006/0181903 A1 | 8/2006 | Okuwaki |
| 2006/0187676 A1 | 8/2006 | Ishikura |
| 2006/0193582 A1 | 8/2006 | Ouderkirk et al. |
| 2006/0209012 A1 | 9/2006 | Hagood, IV |
| 2006/0209385 A1 | 9/2006 | Liu |
| 2006/0215958 A1 | 9/2006 | Yeo |
| 2006/0227532 A1 | 10/2006 | Ko et al. |
| 2006/0246233 A1 | 11/2006 | Fukuda |
| 2006/0250335 A1 | 11/2006 | Stewart et al. |
| 2006/0250350 A1 | 11/2006 | Kothari et al. |
| 2006/0250676 A1 | 11/2006 | Hagood |
| 2006/0262562 A1 | 11/2006 | Fukasawa et al. |
| 2006/0265919 A1 | 11/2006 | Huang |
| 2006/0268574 A1 | 11/2006 | Jung et al. |
| 2006/0274243 A1 | 12/2006 | Iijima et al. |

(56) References Cited

U.S. PATENT DOCUMENTS

| | | |
|---|---|---|
| 2006/0279558 A1 | 12/2006 | Van Delden et al. |
| 2006/0285356 A1 | 12/2006 | Tseng |
| 2006/0286381 A1 | 12/2006 | Naito et al. |
| 2006/0290253 A1 | 12/2006 | Yeo et al. |
| 2006/0291769 A1 | 12/2006 | Spoonhower et al. |
| 2007/0018585 A1 | 1/2007 | Ijzerman et al. |
| 2007/0036492 A1 | 2/2007 | Lee |
| 2007/0042524 A1 | 2/2007 | Kogut et al. |
| 2007/0064294 A1 | 3/2007 | Hoshino et al. |
| 2007/0070270 A1 | 3/2007 | Yu et al. |
| 2007/0097694 A1 | 5/2007 | Faase et al. |
| 2007/0114523 A1 | 5/2007 | Oumi et al. |
| 2007/0116424 A1 | 5/2007 | Ting et al. |
| 2007/0125415 A1 | 6/2007 | Sachs |
| 2007/0132843 A1 | 6/2007 | Miles |
| 2007/0133935 A1 | 6/2007 | Fine |
| 2007/0134438 A1 | 6/2007 | Fabick |
| 2007/0146887 A1 | 6/2007 | Ikeda et al. |
| 2007/0147087 A1 | 6/2007 | Parker et al. |
| 2007/0171330 A1 | 7/2007 | Hung et al. |
| 2007/0187852 A1 | 8/2007 | Parker et al. |
| 2007/0189036 A1 | 8/2007 | Chen et al. |
| 2007/0201056 A1 | 8/2007 | Cok et al. |
| 2007/0201234 A1 | 8/2007 | Ottermann |
| 2007/0210163 A1 | 9/2007 | Han |
| 2007/0229737 A1 | 10/2007 | Takeda |
| 2007/0229936 A1 | 10/2007 | Miles |
| 2007/0241340 A1 | 10/2007 | Pan |
| 2007/0247704 A1 | 10/2007 | Mignard |
| 2007/0253054 A1 | 11/2007 | Miles |
| 2007/0268695 A1 | 11/2007 | Seetzen |
| 2007/0279727 A1 | 12/2007 | Gandhi et al. |
| 2007/0279935 A1 | 12/2007 | Gardiner et al. |
| 2007/0291362 A1 | 12/2007 | Hill et al. |
| 2007/0292091 A1 | 12/2007 | Fujii et al. |
| 2008/0030650 A1 | 2/2008 | Kitagawa et al. |
| 2008/0037281 A1 | 2/2008 | Chang |
| 2008/0042154 A1 | 2/2008 | Wano |
| 2008/0043490 A1 | 2/2008 | Coleman et al. |
| 2008/0084600 A1 | 4/2008 | Bita et al. |
| 2008/0089063 A1 | 4/2008 | Chen |
| 2008/0090025 A1 | 4/2008 | Freking et al. |
| 2008/0094853 A1 | 4/2008 | Kim et al. |
| 2008/0112039 A1 | 5/2008 | Chui |
| 2008/0137175 A1 | 6/2008 | Lin |
| 2008/0151347 A1 | 6/2008 | Chui |
| 2008/0170414 A1 | 7/2008 | Wang |
| 2008/0192259 A1 | 8/2008 | Sumiyama |
| 2008/0192484 A1 | 8/2008 | Lee |
| 2008/0232135 A1 | 9/2008 | Kinder et al. |
| 2008/0239216 A1 | 10/2008 | Miyamoto |
| 2008/0266333 A1 | 10/2008 | Silverstein et al. |
| 2008/0278796 A1 | 11/2008 | Roosendaal et al. |
| 2008/0285307 A1 | 11/2008 | Aylward et al. |
| 2008/0285308 A1 | 11/2008 | Clary et al. |
| 2009/0050454 A1 | 2/2009 | Matsukawa et al. |
| 2009/0059346 A1 | 3/2009 | Xu |
| 2009/0073540 A1 | 3/2009 | Kothari et al. |
| 2009/0086301 A1 | 4/2009 | Gally et al. |
| 2009/0086466 A1 | 4/2009 | Sugita et al. |
| 2009/0090611 A1 | 4/2009 | Zeijlon et al. |
| 2009/0096956 A1 | 4/2009 | Uehara et al. |
| 2009/0097100 A1 | 4/2009 | Gally et al. |
| 2009/0101192 A1 | 4/2009 | Kothari et al. |
| 2009/0101623 A1 | 4/2009 | Bita et al. |
| 2009/0103161 A1 | 4/2009 | Kothari et al. |
| 2009/0103165 A1 | 4/2009 | Kothari et al. |
| 2009/0103166 A1 | 4/2009 | Khazeni et al. |
| 2009/0103311 A1 | 4/2009 | Wu et al. |
| 2009/0126777 A1 | 5/2009 | Khazeni et al. |
| 2009/0126792 A1 | 5/2009 | Gruhlke |
| 2009/0151771 A1 | 6/2009 | Kothari et al. |
| 2009/0168459 A1 | 7/2009 | Holman et al. |
| 2009/0190373 A1 | 7/2009 | Bita et al. |
| 2009/0196068 A1 | 8/2009 | Wang et al. |
| 2009/0199893 A1 | 8/2009 | Bita et al. |
| 2009/0199900 A1 | 8/2009 | Bita et al. |
| 2009/0201301 A1 | 8/2009 | Mienko et al. |
| 2009/0201565 A1 | 8/2009 | Bita et al. |
| 2009/0201571 A1 | 8/2009 | Gally |
| 2009/0213298 A1 | 8/2009 | Mimura et al. |
| 2009/0225394 A1 | 9/2009 | Chui et al. |
| 2009/0225396 A1 | 9/2009 | Sampsell |
| 2009/0231275 A1 | 9/2009 | Odgers |
| 2009/0231877 A1 | 9/2009 | Mienko et al. |
| 2009/0242024 A1 | 10/2009 | Kothari et al. |
| 2009/0244690 A1 | 10/2009 | Lee |
| 2009/0251752 A1 | 10/2009 | Gruhlke |
| 2009/0255569 A1 | 10/2009 | Sampsell |
| 2009/0257108 A1 | 10/2009 | Gruhlke et al. |
| 2009/0293955 A1 | 12/2009 | Kothari et al. |
| 2009/0293995 A1 | 12/2009 | Tanaka et al. |
| 2009/0294785 A1 | 12/2009 | Cok |
| 2009/0296193 A1 | 12/2009 | Bita et al. |
| 2009/0303417 A1 | 12/2009 | Mizushima et al. |
| 2009/0323144 A1 | 12/2009 | Gruhlke et al. |
| 2009/0323153 A1 | 12/2009 | Sampsell |
| 2010/0026727 A1 | 2/2010 | Bita et al. |
| 2010/0033988 A1 | 2/2010 | Chiu et al. |
| 2010/0039832 A1 | 2/2010 | Ahlgren et al. |
| 2010/0052880 A1 | 3/2010 | Laitinen et al. |
| 2010/0096006 A1 | 4/2010 | Griffiths et al. |
| 2010/0096011 A1 | 4/2010 | Griffiths et al. |
| 2010/0110340 A1 | 5/2010 | Mather et al. |
| 2010/0118239 A1 | 5/2010 | Roosendaal et al. |
| 2010/0141557 A1 | 6/2010 | Gruhlke |
| 2010/0149624 A1 | 6/2010 | Kothari |
| 2010/0172012 A1 | 7/2010 | Sampsell |
| 2010/0182308 A1 | 7/2010 | Holman et al. |
| 2010/0188367 A1 | 7/2010 | Nagafuji et al. |
| 2010/0195310 A1 | 8/2010 | Baar |
| 2010/0214642 A1 | 8/2010 | Miles |
| 2010/0226118 A1 | 9/2010 | Baar |
| 2010/0238529 A1 | 9/2010 | Sampsell et al. |
| 2010/0245370 A1 | 9/2010 | Narayanan et al. |
| 2010/0245975 A1 | 9/2010 | Cummings |
| 2010/0278480 A1 | 11/2010 | Vasylyev |
| 2010/0302185 A1 | 12/2010 | Han et al. |
| 2010/0302616 A1 | 12/2010 | Bita et al. |
| 2010/0302802 A1 | 12/2010 | Bita |
| 2010/0302803 A1 | 12/2010 | Bita et al. |
| 2010/0309103 A1 | 12/2010 | Sampsell |
| 2010/0309540 A1 | 12/2010 | Miles |
| 2011/0025727 A1 | 2/2011 | Li |
| 2011/0032214 A1 | 2/2011 | Gruhlke et al. |
| 2011/0043889 A1 | 2/2011 | Mignard |
| 2011/0075246 A1 | 3/2011 | Wang |
| 2011/0157058 A1 | 6/2011 | Bita et al. |
| 2011/0157093 A1 | 6/2011 | Bita et al. |
| 2011/0199667 A1 | 8/2011 | Wang et al. |
| 2011/0199669 A1 | 8/2011 | Chui |
| 2011/0316861 A1 | 12/2011 | Gally et al. |
| 2012/0002265 A1 | 1/2012 | Kothari |
| 2012/0057107 A1 | 3/2012 | Kitagawa et al. |
| 2012/0069031 A1 | 3/2012 | Bita et al. |
| 2012/0081406 A1 | 4/2012 | Li et al. |
| 2012/0099177 A1 | 4/2012 | Chui et al. |
| 2012/0154881 A1 | 6/2012 | Gruhlke et al. |
| 2012/0206788 A1 | 8/2012 | Sampsell |
| 2013/0106712 A1 | 5/2013 | Cummings et al. |
| 2013/0127922 A1 | 5/2013 | Poliakov et al. |
| 2013/0328838 A1 | 12/2013 | Bita et al. |
| 2013/0328943 A1 | 12/2013 | Bita et al. |

FOREIGN PATENT DOCUMENTS

| | | |
|---|---|---|
| CN | 1272922 | 11/2000 |
| CN | 1286424 | 3/2001 |
| CN | 1381752 | 11/2002 |
| CN | 1384392 | 12/2002 |
| CN | 1384392 A | 12/2002 |
| CN | 1409157 A | 4/2003 |
| CN | 1420703 A | 5/2003 |
| CN | 1447887 | 10/2003 |

(56) References Cited

FOREIGN PATENT DOCUMENTS

| | | |
|---|---|---|
| CN | 2624220 Y | 7/2004 |
| CN | 1517743 A | 8/2004 |
| CN | 1559000 | 12/2004 |
| CN | 1639596 | 7/2005 |
| CN | 1643439 A | 7/2005 |
| CN | 1670593 | 9/2005 |
| CN | 1744163 | 3/2006 |
| CN | 1744163 A | 3/2006 |
| CN | 1755494 A | 4/2006 |
| CN | 1795403 | 6/2006 |
| CN | 1811549 | 8/2006 |
| DE | 34 02 746 | 8/1985 |
| DE | 196 22 748 | 12/1997 |
| DE | 19942513 A1 | 3/2001 |
| DE | 102 28 946 | 1/2004 |
| DE | 10329917 | 2/2005 |
| DE | 102007025092 A1 | 12/2008 |
| EP | 0223136 A2 | 5/1987 |
| EP | 0 278 038 | 8/1988 |
| EP | 0389031 A1 | 9/1990 |
| EP | 0 539 099 | 4/1993 |
| EP | 0 590 511 | 4/1994 |
| EP | 0 621 500 | 10/1994 |
| EP | 0667548 A1 | 8/1995 |
| EP | 0786911 A2 | 7/1997 |
| EP | 0 822 441 | 2/1998 |
| EP | 0830032 A2 | 3/1998 |
| EP | 0855745 A2 | 7/1998 |
| EP | 0867747 A2 | 9/1998 |
| EP | 0 879 991 | 11/1998 |
| EP | 0895274 A1 | 2/1999 |
| EP | 0907050 A1 | 4/1999 |
| EP | 0957392 | 11/1999 |
| EP | 0984314 A2 | 3/2000 |
| EP | 1003062 A1 | 5/2000 |
| EP | 1014161 A1 | 6/2000 |
| EP | 1 081 633 | 3/2001 |
| EP | 1089115 A1 | 4/2001 |
| EP | 1093105 A1 | 4/2001 |
| EP | 1 116 987 | 7/2001 |
| EP | 1113218 A1 | 7/2001 |
| EP | 1 122 586 | 8/2001 |
| EP | 1127984 A1 | 8/2001 |
| EP | 1 143 270 | 10/2001 |
| EP | 1 199 512 | 4/2002 |
| EP | 1231757 A2 | 8/2002 |
| EP | 1 251 454 | 10/2002 |
| EP | 1 271 223 | 1/2003 |
| EP | 1 279 892 | 1/2003 |
| EP | 1 296 094 | 3/2003 |
| EP | 1298635 A2 | 4/2003 |
| EP | 1306609 A1 | 5/2003 |
| EP | 1329664 | 7/2003 |
| EP | 1 336 876 | 8/2003 |
| EP | 1 347 315 | 9/2003 |
| EP | 1341025 A1 | 9/2003 |
| EP | 1 389 775 | 2/2004 |
| EP | 1 413 543 | 4/2004 |
| EP | 1 437 610 | 7/2004 |
| EP | 1445629 A1 | 8/2004 |
| EP | 1450418 A2 | 8/2004 |
| EP | 1 519 218 | 3/2005 |
| EP | 1531302 A1 | 5/2005 |
| EP | 1544537 A1 | 6/2005 |
| EP | 1 577 701 | 9/2005 |
| EP | 1640314 | 3/2006 |
| EP | 1640761 A1 | 3/2006 |
| EP | 1640767 A1 | 3/2006 |
| EP | 1640776 | 3/2006 |
| EP | 1640778 | 3/2006 |
| EP | 1640779 | 3/2006 |
| EP | 1640780 | 3/2006 |
| EP | 1640961 A2 | 3/2006 |
| EP | 1670065 A1 | 6/2006 |
| EP | 1698918 A1 | 9/2006 |
| EP | 1 734 401 | 12/2006 |
| EP | 1 748 305 | 1/2007 |
| EP | 1780585 A2 | 5/2007 |
| EP | 1800183 | 6/2007 |
| EP | 1947551 A2 | 7/2008 |
| EP | 2051124 A2 | 4/2009 |
| EP | 2 068 180 | 6/2009 |
| EP | 2068181 A1 | 6/2009 |
| EP | 1640337 | 10/2009 |
| EP | 2 141 408 | 1/2010 |
| EP | 2163920 A1 | 3/2010 |
| EP | 2251731 A1 | 11/2010 |
| EP | 2259122 | 12/2010 |
| EP | 2259123 | 12/2010 |
| EP | 2264508 | 12/2010 |
| EP | 2264509 | 12/2010 |
| EP | 2264510 | 12/2010 |
| EP | 1640313 | 2/2011 |
| EP | 1640764 | 4/2011 |
| EP | 2 366 942 | 9/2011 |
| EP | 2 366 943 | 9/2011 |
| EP | 2 366 944 | 9/2011 |
| EP | 2 366 945 | 9/2011 |
| EP | 2 366 946 | 9/2011 |
| EP | 2388234 A1 | 11/2011 |
| EP | 1640770 | 4/2012 |
| EP | 1 943 555 | 5/2012 |
| GB | 2 260 203 | 4/1993 |
| GB | 2 278 222 | 11/1994 |
| GB | 2 315 356 | 1/1998 |
| GB | 2321532 A | 7/1998 |
| GB | 2331615 | 5/1999 |
| GB | 2336933 | 11/1999 |
| GB | 2340281 | 2/2000 |
| GB | 2351834 A | 1/2001 |
| JP | 56010976 | 2/1981 |
| JP | 56010977 | 2/1981 |
| JP | 56088111 | 7/1981 |
| JP | 573266 | 1/1982 |
| JP | 57003266 | 1/1982 |
| JP | 58115781 | 7/1983 |
| JP | 60147718 | 8/1985 |
| JP | 60165621 A | 8/1985 |
| JP | 60242408 A | 12/1985 |
| JP | 62 009317 | 1/1987 |
| JP | 56395489 A | 4/1988 |
| JP | 2068513 A | 3/1990 |
| JP | 02151079 | 6/1990 |
| JP | 3199920 A | 8/1991 |
| JP | 04 081816 | 3/1992 |
| JP | 4053220 U | 5/1992 |
| JP | 04190323 | 7/1992 |
| JP | 04238321 | 8/1992 |
| JP | 05 281479 | 10/1993 |
| JP | 6209114 A | 7/1994 |
| JP | 6265870 A | 9/1994 |
| JP | 07-509327 | 10/1995 |
| JP | 8018990 A | 1/1996 |
| JP | 8050283 A | 2/1996 |
| JP | 08094992 | 4/1996 |
| JP | 08 271874 | 10/1996 |
| JP | 09 022012 | 1/1997 |
| JP | 9005735 A | 1/1997 |
| JP | 09068722 | 3/1997 |
| JP | 09160032 | 6/1997 |
| JP | 9171111 A | 6/1997 |
| JP | 09189869 A | 7/1997 |
| JP | 09189910 A | 7/1997 |
| JP | 09-507920 | 8/1997 |
| JP | 9230324 A | 9/1997 |
| JP | 09260696 | 10/1997 |
| JP | 09281917 | 10/1997 |
| JP | 09 307140 | 11/1997 |
| JP | 09311333 | 12/1997 |
| JP | 10 500224 | 1/1998 |
| JP | 10096910 A | 4/1998 |
| JP | 10186249 A | 7/1998 |
| JP | 10202948 | 8/1998 |
| JP | 10325953 A | 12/1998 |

(56) References Cited

FOREIGN PATENT DOCUMENTS

| | | |
|---|---|---|
| JP | H103262515 A | 12/1998 |
| JP | 11002712 A | 1/1999 |
| JP | 11002764 A | 1/1999 |
| JP | 11052887 A | 2/1999 |
| JP | 11064836 A | 3/1999 |
| JP | 11064882 A | 3/1999 |
| JP | 11072721 A | 3/1999 |
| JP | 11 160687 | 6/1999 |
| JP | 11167808 A | 6/1999 |
| JP | 11 174234 | 7/1999 |
| JP | 11184387 A | 7/1999 |
| JP | 11 211999 | 8/1999 |
| JP | 11231321 A | 8/1999 |
| JP | 11232919 | 8/1999 |
| JP | 11249132 A | 9/1999 |
| JP | 11254752 A | 9/1999 |
| JP | 11258558 A | 9/1999 |
| JP | 11295725 | 10/1999 |
| JP | 11295726 A | 10/1999 |
| JP | 11 326903 | 11/1999 |
| JP | 11316553 A | 11/1999 |
| JP | 11326898 A | 11/1999 |
| JP | 2000 500245 | 1/2000 |
| JP | 2000028933 A | 1/2000 |
| JP | 2000 075293 | 3/2000 |
| JP | 2000-089225 | 3/2000 |
| JP | 2000075287 A | 3/2000 |
| JP | 2000081848 | 3/2000 |
| JP | 2000147262 A | 5/2000 |
| JP | 2000181367 | 6/2000 |
| JP | 2000 193933 | 7/2000 |
| JP | 2000214804 A | 8/2000 |
| JP | 2000258622 A | 9/2000 |
| JP | 2000 514568 | 10/2000 |
| JP | 2000 305074 | 11/2000 |
| JP | 2000314882 A | 11/2000 |
| JP | 2000 338310 | 12/2000 |
| JP | 2001021883 | 1/2001 |
| JP | 2001110218 A | 4/2001 |
| JP | 2001222276 A | 8/2001 |
| JP | 2001-297615 | 10/2001 |
| JP | 2001 305312 | 10/2001 |
| JP | 2001283622 A | 10/2001 |
| JP | 2001324606 A | 11/2001 |
| JP | 2001 343514 | 12/2001 |
| JP | 2001345458 | 12/2001 |
| JP | 2002014344 A | 1/2002 |
| JP | 2002040339 A | 2/2002 |
| JP | 2002042525 A | 2/2002 |
| JP | 2002062505 A | 2/2002 |
| JP | 2002 071965 | 3/2002 |
| JP | 2002072284 A | 3/2002 |
| JP | 2002090549 | 3/2002 |
| JP | 2002098838 A | 4/2002 |
| JP | 2002108227 | 4/2002 |
| JP | 2002124113 A | 4/2002 |
| JP | 2002 139630 | 5/2002 |
| JP | 2002131551 A | 5/2002 |
| JP | 2002 174780 | 6/2002 |
| JP | 2002196151 A | 7/2002 |
| JP | 2002208307 A | 7/2002 |
| JP | 2002523798 | 7/2002 |
| JP | 2002-236290 | 8/2002 |
| JP | 2002 245835 | 8/2002 |
| JP | 2002229023 A | 8/2002 |
| JP | 2002 287047 | 10/2002 |
| JP | 2002 297044 | 10/2002 |
| JP | 2002328313 A | 11/2002 |
| JP | 2002365438 A | 12/2002 |
| JP | 2003004950 A | 1/2003 |
| JP | 2003007114 A | 1/2003 |
| JP | 2003021821 A | 1/2003 |
| JP | 2003057652 | 2/2003 |
| JP | 2003057653 A | 2/2003 |
| JP | 2003 066236 | 3/2003 |
| JP | 2003 066451 | 3/2003 |
| JP | 2003131215 | 5/2003 |
| JP | 2003140118 A | 5/2003 |
| JP | 2003147351 A | 5/2003 |
| JP | 2003149642 | 5/2003 |
| JP | 2003149643 | 5/2003 |
| JP | 2003 177405 | 6/2003 |
| JP | 2003173713 A | 6/2003 |
| JP | 2003177336 A | 6/2003 |
| JP | 2003 188959 | 7/2003 |
| JP | 2003 202568 | 7/2003 |
| JP | 2003186008 A | 7/2003 |
| JP | 2003195201 A | 7/2003 |
| JP | 2003 222861 | 8/2003 |
| JP | 2003 255140 | 9/2003 |
| JP | 2003248181 A | 9/2003 |
| JP | 2003255344 A | 9/2003 |
| JP | 2003262867 A | 9/2003 |
| JP | 2003 315560 | 11/2003 |
| JP | 2003-315694 | 11/2003 |
| JP | 2003344881 | 12/2003 |
| JP | 2004-012918 | 1/2004 |
| JP | 2004-062099 | 2/2004 |
| JP | 2004 086221 | 3/2004 |
| JP | 2004070189 A | 3/2004 |
| JP | 2004087409 A | 3/2004 |
| JP | 2004-510185 | 4/2004 |
| JP | 2004111278 A | 4/2004 |
| JP | 2004126196 A | 4/2004 |
| JP | 2004145109 A | 5/2004 |
| JP | 2004-206049 | 7/2004 |
| JP | 2004199006 A | 7/2004 |
| JP | 2004212673 A | 7/2004 |
| JP | 2004212922 A | 7/2004 |
| JP | 2004219843 A | 8/2004 |
| JP | 2004302135 A | 10/2004 |
| JP | 2005031219 A | 2/2005 |
| JP | 2005 135899 | 5/2005 |
| JP | 2005259365 | 9/2005 |
| JP | 2005308871 A | 11/2005 |
| JP | 2005316178 | 11/2005 |
| JP | 2006039056 A | 2/2006 |
| JP | 2006065360 | 3/2006 |
| JP | 2006099061 A | 4/2006 |
| JP | 2006099105 A | 4/2006 |
| JP | 2006099113 A | 4/2006 |
| JP | 2006107993 | 4/2006 |
| JP | 2006120571 | 5/2006 |
| JP | 2006133743 A | 5/2006 |
| JP | 2006179495 A | 7/2006 |
| JP | 2007027150 A | 2/2007 |
| JP | 2007218540 A | 8/2007 |
| JP | 2008514992 | 5/2008 |
| JP | 2009300966 A | 12/2009 |
| JP | 2010156979 | 7/2010 |
| KR | 20020010322 | 2/2002 |
| KR | 100329769 | 3/2002 |
| KR | 20030029769 | 4/2003 |
| KR | 10200300296447 | 4/2003 |
| KR | 20030081662 | 10/2003 |
| KR | 20040016570 A | 2/2004 |
| KR | 20070109557 A | 11/2007 |
| KR | 20070117137 A | 12/2007 |
| TW | 412646 B | 11/2000 |
| TW | 520445 | 2/2003 |
| TW | 200302775 | 8/2003 |
| TW | 552720 B | 9/2003 |
| TW | 556009 B | 10/2003 |
| TW | 567388 B | 12/2003 |
| TW | 579368 B | 3/2004 |
| TW | 594155 | 6/2004 |
| TW | 200500717 | 1/2005 |
| TW | 200512518 | 4/2005 |
| TW | 1331688 B | 10/2010 |
| WO | WO 94/06871 A1 | 3/1994 |
| WO | WO 95/01584 | 1/1995 |
| WO | WO 95/14256 | 5/1995 |
| WO | WO 95/15582 A1 | 6/1995 |
| WO | WO 95/30924 | 11/1995 |

(56) References Cited

FOREIGN PATENT DOCUMENTS

| | | |
|---|---|---|
| WO | WO-9608833 A1 | 3/1996 |
| WO | WO 97/01240 | 1/1997 |
| WO | WO 97/17628 | 5/1997 |
| WO | WO-9716756 A1 | 5/1997 |
| WO | WO-9744707 A2 | 11/1997 |
| WO | WO 97/46908 | 12/1997 |
| WO | WO 98/14828 | 4/1998 |
| WO | WO 98/19201 | 5/1998 |
| WO | WO-9832047 A1 | 7/1998 |
| WO | WO-9835182 A1 | 8/1998 |
| WO | WO-9852094 A1 | 11/1998 |
| WO | WO-9904296 A1 | 1/1999 |
| WO | WO-9952006 A2 | 10/1999 |
| WO | WO 99/63394 | 12/1999 |
| WO | WO-9967678 A2 | 12/1999 |
| WO | WO-9967680 A1 | 12/1999 |
| WO | WO-0011502 A1 | 3/2000 |
| WO | WO 00/50807 | 8/2000 |
| WO | WO-0129148 A1 | 4/2001 |
| WO | WO 01/57434 | 8/2001 |
| WO | WO 01/81994 | 11/2001 |
| WO | WO 01/84228 | 11/2001 |
| WO | WO 01/84229 | 11/2001 |
| WO | WO 01/90637 | 11/2001 |
| WO | WO-0206858 A2 | 1/2002 |
| WO | WO-0224570 A1 | 3/2002 |
| WO | WO 02/071132 | 9/2002 |
| WO | WO-02097324 A1 | 12/2002 |
| WO | WO-03007049 | 1/2003 |
| WO | WO 03/027569 | 4/2003 |
| WO | WO 03/032058 | 4/2003 |
| WO | WO-03038509 A2 | 5/2003 |
| WO | WO 03/056876 | 7/2003 |
| WO | WO 03/062912 | 7/2003 |
| WO | WO 03/075207 | 9/2003 |
| WO | WO-03073151 A1 | 9/2003 |
| WO | WO-03105198 A1 | 12/2003 |
| WO | WO 2004/006003 | 1/2004 |
| WO | WO-2004003643 A1 | 1/2004 |
| WO | WO 2004/015489 | 2/2004 |
| WO | WO-2004012004 A1 | 2/2004 |
| WO | WO 2004/027514 | 4/2004 |
| WO | WO 2004/036270 | 4/2004 |
| WO | WO-2004036294 A2 | 4/2004 |
| WO | WO-2004068182 | 8/2004 |
| WO | WO-2004068460 A1 | 8/2004 |
| WO | WO-2004088372 A1 | 10/2004 |
| WO | WO-2004114418 A1 | 12/2004 |
| WO | WO-2005011012 A1 | 2/2005 |
| WO | WO-2005076051 | 8/2005 |
| WO | WO-2005088367 A1 | 9/2005 |
| WO | WO-2005093490 | 10/2005 |
| WO | WO 2005/111669 | 11/2005 |
| WO | WO-2006008702 A2 | 1/2006 |
| WO | WO 2006/026743 | 3/2006 |
| WO | WO-2006031545 A1 | 3/2006 |
| WO | WO 2006/036451 | 4/2006 |
| WO | WO-2006036415 | 4/2006 |
| WO | WO-2006036440 | 4/2006 |
| WO | WO-2006036496 | 4/2006 |
| WO | WO-2006036519 | 4/2006 |
| WO | WO-2006036540 A1 | 4/2006 |
| WO | WO-2006036564 | 4/2006 |
| WO | WO-2006036588 | 4/2006 |
| WO | WO-2006137337 | 12/2006 |
| WO | WO 2007/053308 | 5/2007 |
| WO | WO 2007/073203 A1 | 6/2007 |
| WO | WO-2007064133 A1 | 6/2007 |
| WO | WO 2007-094558 | 8/2007 |
| WO | WO-2007127046 | 11/2007 |
| WO | WO-2007149474 | 12/2007 |
| WO | WO-2008027275 | 3/2008 |
| WO | WO 2008/045200 | 4/2008 |
| WO | WO 2008/045207 | 4/2008 |
| WO | WO 2008/045218 | 4/2008 |
| WO | WO 2008/045222 | 4/2008 |
| WO | WO-2008039229 | 4/2008 |
| WO | WO-2008045224 | 4/2008 |
| WO | WO-2008045310 | 4/2008 |
| WO | WO-2008045311 | 4/2008 |
| WO | WO-2008045311 A2 | 4/2008 |
| WO | WO-2008045312 A1 | 4/2008 |
| WO | WO-2008045362 A2 | 4/2008 |
| WO | WO-2008045363 | 4/2008 |
| WO | WO-2008045364 A2 | 4/2008 |
| WO | WO-2008045462 | 4/2008 |
| WO | WO-2008045463 | 4/2008 |
| WO | WO-2008069877 | 6/2008 |
| WO | WO-2008109620 | 9/2008 |
| WO | WO-2008137299 | 11/2008 |
| WO | WO-2008145096 A1 | 12/2008 |
| WO | WO-2009052324 A2 | 4/2009 |
| WO | WO-2009052326 A2 | 4/2009 |
| WO | WO-2009065069 A1 | 5/2009 |
| WO | WO-2009076075 | 6/2009 |
| WO | WO-2009085706 A2 | 7/2009 |
| WO | WO-2009102672 A2 | 8/2009 |
| WO | WO-2009102731 | 8/2009 |
| WO | WO-2009102733 | 8/2009 |
| WO | WO-2009158354 A1 | 12/2009 |
| WO | WO-2010016557 A1 | 2/2010 |
| WO | WO-2012043396 A1 | 4/2012 |

OTHER PUBLICATIONS

International Search Report and Written Opinion for International Patent Application No. PCT/US2007/020680, dated Jul. 1, 2008.
Miles, M. et al., "Digital Paper™ for reflective displays," Journal of the Society for Information Display, Society for Information Display, San Jose, US, vol. 11, No. 1, pp. 209-215, 2003.
Fan et al. "Channel Drop Filters in Photonic Crystals", Optics Express, vol. 3, No. 1, pp. 4-11, 1998.
Giles et al. "Silicon MEMS Optical Switch Attenuator and Its Use in Lightwave Subsystems", IEEE Journal of Selected Topics in Quantum Electronics, vol. 5. No. 1, pp. 18-25, Jan./Feb. 1999.
Little et al. "Vertically Coupled Microring Rosonator Channel Dropping Filter", IEEE Photonics Technology Letters, vol. 11, No. 2, pp. 215-217, 1999.
Magel, "Integrated Optic Devices Using Micromachined Metal Membranes", SPIE vol. 2686, 0-8194-2060-3, pp. 54-63, 1996.
Mehregany et al., "MEMS applications in Optical Systems," IEEE/LEOS 1996 Summer Topical Meetings, pp. 75-76, Aug. 1996.
Oliner, "Radiating Elements and Mutual Coupling," Microwave Scanning Antennas, vol. 2, pp. 131-157 and pp. 190-194, 1966.
Zhou et al. "Waveguide Panel Display Using Electromechanical Spatial Modulators" SID Digest, vol. XXIX, 1998.
Notice of Allowance in U.S. Appl. No. 11/699,074, dated Jul. 11, 2008.
Request for Continued Examination, Amendment, and Information Disclosure Statement in U.S. Appl. No. 11/699,074, dated Oct. 10, 2008.
Notice of Allowance in U.S. Appl. No. 11/699,074, dated Oct. 31, 2008.
Request for Continued Examination and Information Disclosure Statement in U.S. Appl. No. 11/699,074, dated Jan. 30, 2009.
Notice of Allowance in U.S. Appl. No. 11/699,074, dated Feb. 26, 2009.
Request for ContInuted Examination and Information Disclosure Statement in U.S. Appl. No. 11/699,074, dated May 22, 2009.
Notice of Allowance in U.S. Appl. No. 11/699,074, dated Jun. 26, 2009.
Request for Continued Examination and Information Disclosure Statement in U.S. Appl. No. 11/699,074, dated Nov. 12, 2009.
Supplemental Amendment in U.S. Appl. No. 11/699,074, dated Nov. 24, 2009.
Notice of Allowance in U.S. Appl. No. 11/699,074, dated Dec. 3, 2009.
Request for Continued Examination, Amendment, and Information Disclosure Statement in U.S. Appl. No. 11/699,074, dated Mar. 3, 2010.

(56) References Cited

OTHER PUBLICATIONS

Notice of Allowance in U.S. Appl. No. 11/699,074, dated Mar. 11, 2010.
Comments on Statement of Reasons for Allowance in U.S. Appl. No. 11/699,074, dated Jun. 11, 2010.
Extended Search Report in European Application No. 11160289.2-2217, dated Aug. 19, 2011.
Extended Search Report in European Application No. 11160294.2-2217, dated Aug. 19, 2011.
Extended Search Report in European Application No. 11160297.5-2217, dated Aug. 19, 2011.
Extended Search Report in European Application No. 11160299.1-2217, dated Aug. 19, 2011.
Extended Search Report in European Application No. 11160304.9-2217, dated Aug. 19, 2011.
Official Communication in Chinese Patent Application No. 200780037248.3, dated Aug. 6, 2010.
Official Communication in Chinese Patent Application No. 200780037248.3, dated Apr. 26, 2011.
Official Communication in European Application No. 07 838 811, dated Mar. 2, 2010.
Summons to Attend Oral Proceedings in European Application No. 07 838 811, dated Mar. 18, 2011.
Official Communication in Japanese Patent Application No. 2009-531391, dated May 31, 2011.
International Preliminary Report of Patentability in PCT/US2007/020680 (International Publication No. WO 2008/045200) dated Apr. 16, 2009.
Extended Search Report in European Application No. 08152870.5 dated Mar. 3, 2010.
Official Communication in European Patent Application No. 08152870.5 dated Aug. 11, 2011.
Official Communication in Chinese Patent Application No. 200780037248.3, dated Dec. 7, 2011.
Result of Consultation in European Application No. 07 838 811.3, dated Sep. 27, 2011.
Minutes of the Oral Proceedings in European Application No. 07 838 811.3, dated Oct. 26, 2011.
Official Communication in Chinese Patent Application No. 200780037248.3, dated Jun. 26, 2012.
Official Communication in Chinese Patent Application No. 200780037248.3, dated Jan. 17, 2013.
Official Communication in European Patent Application No. 08152870.5 dated Nov. 13, 2012.
Official Communication in Japanese Patent Application No. 2009-531391, dated May 15, 2012.
Partial European Search Report—EP08152870—Search Authority—Munich—Nov. 27, 2009.
Office Action in European Application No. 11160289.2-2217, dated May 22, 2012.
Office Action in European Application No. 11160297.5-2217, dated May 22, 2012.
Office Action in European Application No. 11160299.1-2217, dated May 22, 2012.
Abilieah A, "Optical Tiled AMLCD for Very Large Display Applications," SID International Symposium Digest of Papers, Boston, 1992, 945-949.
"ABS 407 Visible Narrow Band Absorber," downloaded from http://www.exciton.com/pdfs/ABS407.pdf on Feb. 8, 2011.
Akasaka Y., "Three-Dimensional IC Trends," Proceedings of IEEE, 1986, vol. 74 (12), pp. 1703-1714.
Application as filed in U.S. Appl. No. 13/229,467, dated Sep. 9, 2011.
Application as Filed in U.S. Appl. No. 12/969,224, dated Dec. 15, 2010.
Aratani K, et al., "Process and Design Considerations for Surface Micromachined Beams for a Tuneable Interferometer Array in Silicon," Proc. IEEE Microelectromechanical workshop fort Lauderdale FL, 1993, 230-235.

Aratani K. et al., "Surface Micromachined Tuneable Interferometer Array," Sensors and Actuators A,Elsevier Sequoia S.A., Lausanne, CH, A, 1993, 43(1/3), 17-23.
Austrian Search Report for U.S. Appl. No. 11/036,965 dated Jul. 25, 2005 (Publication No. 2005/0179977).
Austrian Search Report for U.S. Appl. No. 11/040,824 dated Jul. 14, 2005 (Publication No. 2006/077522).
Austrian Search Report for U.S. Appl. No. 11/052,004 dated Jul. 1, 2005 (Publication No. 2006/077509).
Austrian Search Report for U.S. Appl. No. 11/057,392 dated May 12, 2005 (Publication No. 2006/077510).
Austrian Search Report for U.S. Application No. 11/064,143 dated Aug. 12, 2005.
Austrian Search Report for U.S. Appl. No. 11/051,258 dated May 13, 2005.
Austrian Search Report for U.S. Appl. No. 11/077,974 dated Jul. 14, 2005.
Austrian Search Report in U.S. Appl. No. 11/041,020 dated May 9, 2005.
Billard C, "Tunable Capacitor," 5th Annual Review of LETI, 2003, p. 7.
Brosnihan, et al., "Optical MEMS—A Fabrication Process for MEMS Optical Switches With Integrated On-Chip Electronics," 12th International Conference on Transducers, Solid-State Sensors, Actuators and Microsystems, 2003, vol. 2, pp. 1638-1642.
Cacharelis, et al., "A Reflective-Mode PDLC Light Valve Display Technology," Proceedings of European Solid State Device Research Conference (ESSDERC), 1997, pp. 596-599.
Chemical Properties Handbook, McGraw-Hill, 1999, Refractive Index, Dipole Moment and Radius of Gyration; Inorganic Compounds, No. 151: O2Si.
Conner, "Hybrid Color Display using Optical Interference Filter Array," SID Digest, 1993, 577-580.
Co-pending U.S. Appl. No. 13/494,897, filed Jun. 12, 2012 (103059U1).
Co-pending U.S. Appl. No. 13/494,898, filed Jun. 12, 2012.
Demiryont, et al., "Innovative Transparent Electrode for Flexible Displays," Defense, Security, Cockpit and Future Display II, Proc. of SPIE, Apr. 2006, vol. 6225, pp. 622519-1 to 622519-9.
Dewitt S, "Integrating Touch Screens and Optical Films When Where and How," 3M Touch Systems Society for Information Display, Americas Display Engineering & Applications Conference, Oct. 24-27, 2005, Portland, Oregon U.S.A.
Dokmeci, et al., "Two-Axis Single-Crytal Silicon Micromirror Arrays," Journal of Microelectromechanical Systems, Dec. 2004, 13(6), 1006-1017.
Extended Search Report in European Application No. 07838811.3 dated Mar. 2, 2010.
Feenstra, et al., "Electrowetting displays," Liquavista BV, Jan. 2006, 16 pp.
"Glass Polarizing and Interference Filters," American Institute of Physics Handbook, 1982, pp. 6-172 to 6-178.
Gokturk, et al., "A Time-Of-Flight Depth Sensor—System Description, Issues and Solutions," 2004 Conference on Computer Vision and Pattern Recognition workshop (CVPRW'04), 2004, 3, 35-42.
Goossen, et al., "Silicon Modulator Based on Mechnically-Active Anti-Reflection Layer With 1Mbit/Sec Capability for Fiber-In-The-Loop Applications," IEEE Photonics Technology Letters, 1994, 1119-1121.
Goossen K.W. et al., "Possible Display Applications of the Silicon Mechanical Antireflection Switch," Society for Information Display, 1994.
Goossen K.W., "MEMS-Based Variable Optical Interference Devices," IEEE/Lens International Conference on Optical Mems, Conference Digest, Piscataway, NJ, USA, IEEE Aug. 21, 2000, pp. 17-18.
Gosch, "West Germany Grabs the Lead in X-Ray Lithography," Electronics, 1987, 78-80.
Hohlfeld, et al., "Micro-Machined Tunable Optical Filters with Optimized Band-Pass Spectrum," 12th International Conference on Transducers, Solid-State Sensors, Actuators and Microsystems, 2003, vol. 2, 1494-1497.

(56) References Cited

OTHER PUBLICATIONS

Howard, et al., "Nanometer-Scale Fabrication Techniques," VLSI Electronics: Microstructure Science, 1982, vol. 5, 145-153, 166-173.
Huang, et al., "Multidirectional Asymmetrical Microlens-Array Light Control Films for High Performance Reflective Liquid Crystal Displays," SID Digest, 2002, pp. 870-873.
Imenes, et al., "Spectral Beam Splitting Technology for Increased Conversion Efficiency in Solar Concentrating Systems a Review," Solar Energy Materials, Elsevier Science, Publishers B.V. Amsterdam, NL, Oct. 1, 2004, vol. 84, pp. 19-69, XP002474546.
Jackson, "Classical Electrodynamics," John Wiley & Sons Inc, 1962, pp. 568-573.
Jerman, et al., "A Miniature Fabry-Perot Interferometer Fabricated Using Silicon Micromachining Techniques," IEEE Electron Devices Society, 1988.
Jerman et al., "A Miniature Fabry-Perot Interferometer with a Corrugated Silicon Diaphragm Support", IEEE Electron Devices Society, pp. 140-144, 1990.
Jerman, et al., "Miniature Fabry-Perot Interferometers Micromachines in Silicon for use in Optical Fiber WDM Systems," Transducers, Proceedings on the International Conference on Solid State Sensors and Actuators, 1991, vol. ConF. 6, San Francisco, 372-375.
Johnson, "Optical Scanners," Microwave Scanning Antennas, 1964, vol. 1(2), 251-261.
Kowarz, et al., "Conformal Grating Electromechanical System (Gems) for High-Speed Digital Light Modulation," Proceedings of the IEEE 15th Annual International Conference on Micro Electro Mechanical Systems, MEMS 2002, pp. 568-573.
Lau, "The Characterization of Silicon Dioxide and Silicon Nitride Thin Films, in Infrared Characterization for Microelectronics," World Scientific Publishing Co. Pte. Ltd., New Jersey, 1999, 5, pp. 55-71.
Lezec, "Submicrometer Dimple Array Based Interference Color Field Displays and Sensors," Nano Letters, 2006, 7(2), 329-333.
Light Over Matter Circle No. 36, Jun. 1993.
Lin, et al., "Development of UV Stable LED Encapsulants," Microsystems, Packaging, Assembly and Circuits Technology Conference, Impact 2009, 4th, 565-567.
Londergan, et al., "Advanced processes for MEMS-based displays," Proceedings of the Asia Display, 2007, SID, 1, 107-112.
Longhurst R.S., "Geometrical and Physical Optics", Chapter IX: Multiple Beam Interferometry, pp. 153-157,1963.
Maeda, et al., "A Study of a High Quality Front Lighting System for Reflective Full-Color Liquid Crystal Displays," Record of Electrical and Communication, Engineering Conversazione Tohoku University, Sep. 2009, v 78(1), 415-416, ISSN: 0385-7719.
Maier et al., 1996 1 .3" ActiveMatrix liquid crystal spatial light modulator with 508 dpi resolution, SPIE vol. 2754, pp. 171-179.
Miles M.W., "A MEMS Based Interferometric Modulator (IMOD) for Display Applications" Proceedings of Sensors Expo, Oct. 21, 1997 © 1997 Helmer's Publishing, Inc., pp. 281-284 XP009058455.
Miles M.W., "A New Reflective FPD Technology using Interferometric Modulation," Journal of the SID, 1997, vol. 5(4), 379-382.
Miles M.W., et al., "Interferometric Modulation MEMS as an enabling technology for high-performance reflective displays," Proceedings of the SPIE, 2003, 4985, 131-139.
Nakagawa et al., "Wide-Field-of-View Narrow-Band Spectral Filters Based on Photonic Crystal Nanocavities", Optical Society of America, Optics Letters, vol. 27, No. 3, pp. 191-193, Feb. 1, 2002.
Neal T.D. et al., "Surface Plasmon Enhanced Emission From Dye Doped Polymer Layers," Optics Express Opt. Soc. America, USA, Jul. 11, 2005,vol. 13(14), 5522-5527.
Newsbreaks, "Quantum-trench devices might operated at terahertz frequencies", Laser Focus World, May 1993.
Nieminen, et al., "Design of a Temperature-Stable RF MEMS Capacitor," Institute of Electrical and Electronics Engineers (IEEE) Journal of Microelectromechanical Systems, 2004, vol. 13(5), 705-714.
Obi et al., "Fabrication of Optical Mems in Sol/Gel Materials," IEEE/LEOS International Conference on Optical Mems, 2002, Conference Digest, pp. 39-40.
Pape, et al., "Characteristics of the Deformable Mirror Device for Optical Information Processing," Optical Engineering, Nov.-Dec. 1983, 22(6), 676-681.
Petschick, et.al., "Fabry-Perot-Interferometer," available at http://pl.physik.tuberlin.de/groups/pg279/protokolless02/04_fpi.pdf, pp. 50-60, May 14, 2002.
Qualcomm MEMS Technologies, Inc., May 2008, Interferometric Modulator (IMOD), Technology Overview, White Paper, 14 pp.
Raley, et al., "A Fabry-Perot Microinterferometer for Visible Wavelengths," IEEE Solid-State Sensor and Actuator Workshop, 1992, 170-173.
Sperger, et al., "High Performance Patterned All-Dielectric Interference Colour Filter for Display Applications," SID Digest, 1994, 81-83.
Stone J.M., "Radiation and Optics, An Introduction to the Classic Theory," 1963, McGraw-Hill, pp. 340-343.
Tai C.Y., et al., "A Transparent Front Lighting System for Reflective-type Displays," SID International Symposium Digest of Technical Papers, Orlando,SID International Symposium Digest of Technical Papers, Santa Ana, SID, vol. 26, 375-378,1995, (XP000657155).
Tai C.Y. et al., "A Transparent Sheet Display by Plastic MEMS," Journal of the SID, 2006, vol. 14 (8), 735-741.
Tolansky, "Multiple-Beam Interference in Multiple-Beam Interferometry of Surfaces and Films," Chap II Oxford at the Clarendon Press, 1948, pp. 8-11.
Walker, et al., "Electron-Beam-Tunable Interference Filter Spatial Light Modulator," Optics Letters, 1988, vol. 13(5), 345-347.
Wang, et al., "Design and Fabrication of a Novel Two-Dimension MEMS-Based Tunable Capacitor," IEEE International Conference on Communications, Circuits and Systems and West Sino Expositions, 2002, vol. 2, 1766-1769.
Winton et al., "A novel way to capture solar energy," Chemical Week, pp. 17-18 (May 15, 1985).
Wu, et al., "Design of a Reflective Color LCD using Optical Interference Reflectors," Asia Display, Changchun Institute of Physics, 1995, 929-931.
Taiwan Search Report—TW096136802—TIPO—Nov. 27, 2013.
Co-pending U.S. Appl. No. 14/057,975, filed Oct. 18, 2013.
Taiwan Search Report—TW096136802—TIPO—Jun. 16, 2014.
Yan, et al., "Edge-Lighting Light Guide Plate Based on Micro-Prism for Liquid Crystal Display," Journal of Display Technology, vol. 5, No. 9, pp. 355-357, Sep. 2009.
Yu et al., "Design Optimization and Stamper Fabrication of Light Guiding Plates Using Silicon Based Micro-Features," IEEE Symposium on DTIP of MEMS/MOEMS, Rome, Apr. 1-3, 2009.

* cited by examiner

OPTICAL LOSS STRUCTURE INTEGRATED IN AN ILLUMINATION APPARATUS

CROSS-REFERENCE TO RELATED APPLICATIONS

This application is a United States national phase under 37 U.S.C. §371 of PCT Patent Application No. PCT/US2007/020680, filed Sep. 24, 2007, entitled "Optical Loss Structure Integrated in an Illumination Apparatus," which claims priority benefit under 35 U.S.C. §119(e) to U.S. Provisional Application Ser. No. 60/850,024, filed Oct. 6, 2006, entitled "Method for Integrating a Light Diffuser in an Illumination Device of a Display System," which is incorporated herein by reference in its entirety.

BACKGROUND

Microelectromechanical systems (MEMS) include micromechanical elements, actuators, and electronics. Micromechanical elements may be created using deposition, etching, and/or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY

In certain embodiments, a display device comprises an optical propagation region, at least one optical loss structure, an optical isolation layer, and a plurality of display elements. The optical propagation region comprises a light guide in which light is guided via total internal reflection. The optical propagation region further comprises turning features configured to redirect the light out of the optical propagation region. The at least one optical loss structure would disrupt the total internal reflection of at least some of the light guided within the optical propagation region if disposed directly adjacent thereto. The optical isolation layer comprises a non-gaseous material between the optical propagation region and the optical loss structure. The optical isolation layer is configured to increase an amount of light that is totally internal reflected in the optical propagation region. The plurality of display elements are positioned to receive the light redirected out of the optical propagation region. The optical loss structure is positioned between the plurality of display elements and the optical propagation region.

In certain embodiments, a display device comprises means for guiding light via total internal reflection, means for disrupting the total internal reflection of at least some of the light guided within the light guiding means if the total internal reflection disrupting means is disposed directly adjacent to the light guiding means, means for optically isolating the light guiding means from the total internal reflection disrupting means, and means for displaying an image. The light guiding means comprises means for redirecting light out of the light guiding means and to the image displaying means. The optical isolating means comprises a non-gaseous material. The optical isolating means is disposed between the light guiding means and the total internal reflection disrupting means. The optically isolating means is configured to increase an amount of light that is totally internal reflected in the light guiding means. The image displaying means is positioned to receive light redirected out of the light guiding means. The total internal reflection disrupting means is positioned between the image displaying means and the light guiding means.

In certain embodiments, a method of manufacturing a display device comprises providing a plurality of display elements, disposing an optical propagation region in proximity to said plurality of display elements, disposing an optical loss structure between the plurality of display elements and the optical propagation region, and disposing an optical isolation layer between the optical propagation region and the optical loss structure. The optical propagation region comprises a light guide in which light is guided via total internal reflection. The optical propagation region comprises turning features configured to redirect the light out of the optical propagation region. The optical loss structure would disrupt the total internal reflection of at least some of the light guided within the optical propagation region if disposed directly adjacent thereto. The optical isolation layer increases the amount of light that is totally internal reflected in the optical propagation region.

In certain embodiments, an illumination apparatus comprises an optical propagation region comprising a light guide in which light is guided via total internal reflection and a layer coupled to the optical propagation region. The optical propagation region further comprises turning features configured to redirect the light out of the optical propagation region. The layer includes a matrix and a microstructure. At least a portion of the layer has an index of refraction less than an index of refraction of the optical propagation region. The layer is configured to increase an amount of light that is totally internal reflected in the optical propagation region.

In certain embodiments, an illumination apparatus comprises an optical propagation region comprising a light guide in which light is guided via total internal reflection, at least one optical loss structure, and an optical isolation layer comprising a non-gaseous material between the optical propagation region and the optical loss structure. The optical propagation region further comprises turning features configured to redirect the light out of the optical propagation region. The at least one optical loss structure is selected from the group consisting of a diffuser, a polarizer, and a color filter. The optical isolation layer is configured to increase an amount of light that is totally internally reflected in the optical propagation region.

In certain embodiments, a method of manufacturing a display device comprises providing an optical propagation region, providing an optical loss structure, and disposing an optical isolation layer between the optical propagation region and the optical loss structure. The optical propagation region comprises a light guide in which light is guided via total internal reflection. The optical propagation region comprises turning features configured to redirect the light out of the optical propagation region. The optical loss structure is selected from the group consisting of a diffuser, a polarizer, and a color filter. The optical isolation layer increases the amount of light that is totally internally reflected in the optical propagation region.

DETAILED DESCRIPTION OF THE PREFERRED EMBODIMENTS

Figure 1:
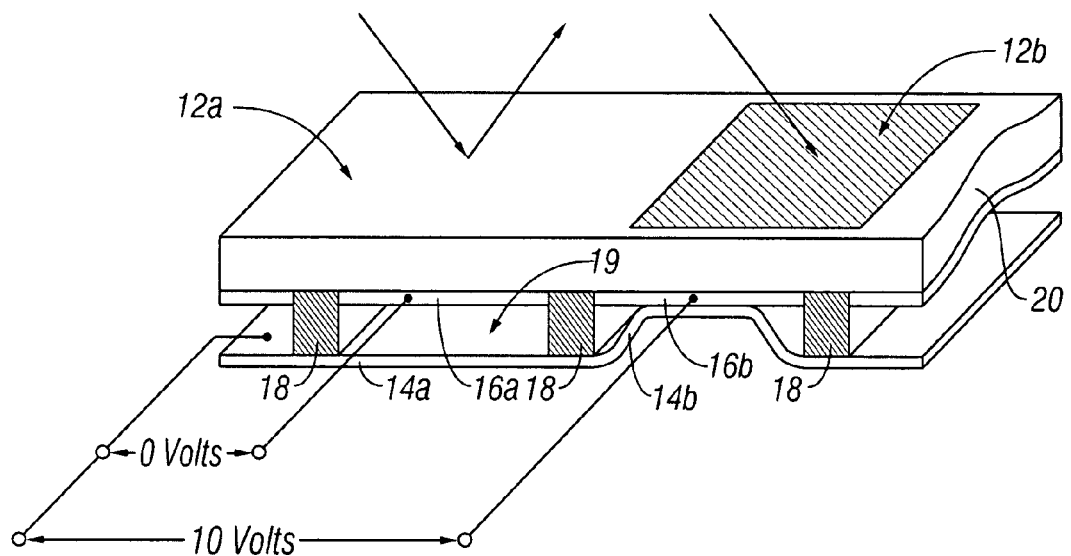
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

An optical isolation layer useful in the illumination assembly of a display device is provided. The optical isolation layer is disposed between an optical propagation region of a light guide used for illumination and an optical loss structure or layer. As used herein, the term "optical loss structure" or "optical loss layer" is to be given its broadest possible meaning, including, but not limited to, a feature that absorbs light or a feature that redirects the propagation of light into directions undesired for the purpose of propagating light in the optical propagation region. For example, the optical loss structure would disrupt the total internal reflection of at least some of the light guided within the optical propagation region if disposed directly adjacent thereto. The optical loss structure or layer may comprise, without limitation, a diffuser, an absorber, a polarizer, a color filter, and the like. The optical propagation region has upper and lower interfaces that support propagation of light along the optical propagation region. Without the optical isolation layer, the lower interface might be formed by the optical propagation region and the optical loss layer. In such a configuration, the optical loss layer may disrupt reflection of light incident on the lower interface at grazing incidence. The optical isolation layer is used to separate the optical propagation region and the optical loss structure or layer, thereby promoting reflection at grazing incidence. In certain embodiments, for example, the optical isolation layer causes light directed at the lower interface of the optical propagation region at grazing incidence (e.g., angles greater than about 40°) to be reflected therefrom. Light is therefore guided along the optical propagation region without substantial disruption by the optical loss structure or layer. The optical isolation layer also causes light directed at the lower interface of the optical propagation region at low angles (e.g., angles greater than about 40°) to pass therethrough with little to no reflection (e.g., less than 4%, less than 2%, less than 1%). As used herein, the term "optical propagation region" may be used to describe a light guide film or plate, a light guide film stack, a substrate having a light guide film or a light guide film stack formed thereon, etc. As used herein, the term "film" is to be given its broadest ordinary meaning, including, but not limited to, a material or plurality of materials having a thickness. In some embodiments, the optical isolation layer comprises a material with a lower index of refraction than the optical propagation region, although the optical isolation layer may comprises material having an index of refraction than the optical propagation region. In some embodiments, the optical isolation layer comprises a multi-layer interference stack. In some embodiments, the optical loss structure and the optical isolation layer are integrated in a single layer. In certain such embodiments, the layer comprises a material including a plurality of particles or microstructures therein. The microstructures can be designed to achieve selected optical functions (e.g., diffuser, color filter, polarizer, etc.).

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical gap with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise several fused layers, which can include an electrode layer, such as indium tin oxide (ITO), a partially reflective layer, such as chromium, and a transparent dielectric. The optical stack 16 is thus electrically conductive, partially transparent, and partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack 16 are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the gap 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5B illustrate one exemplary process and system for using an array of interferometric modulators in a display application.

Figure 2:
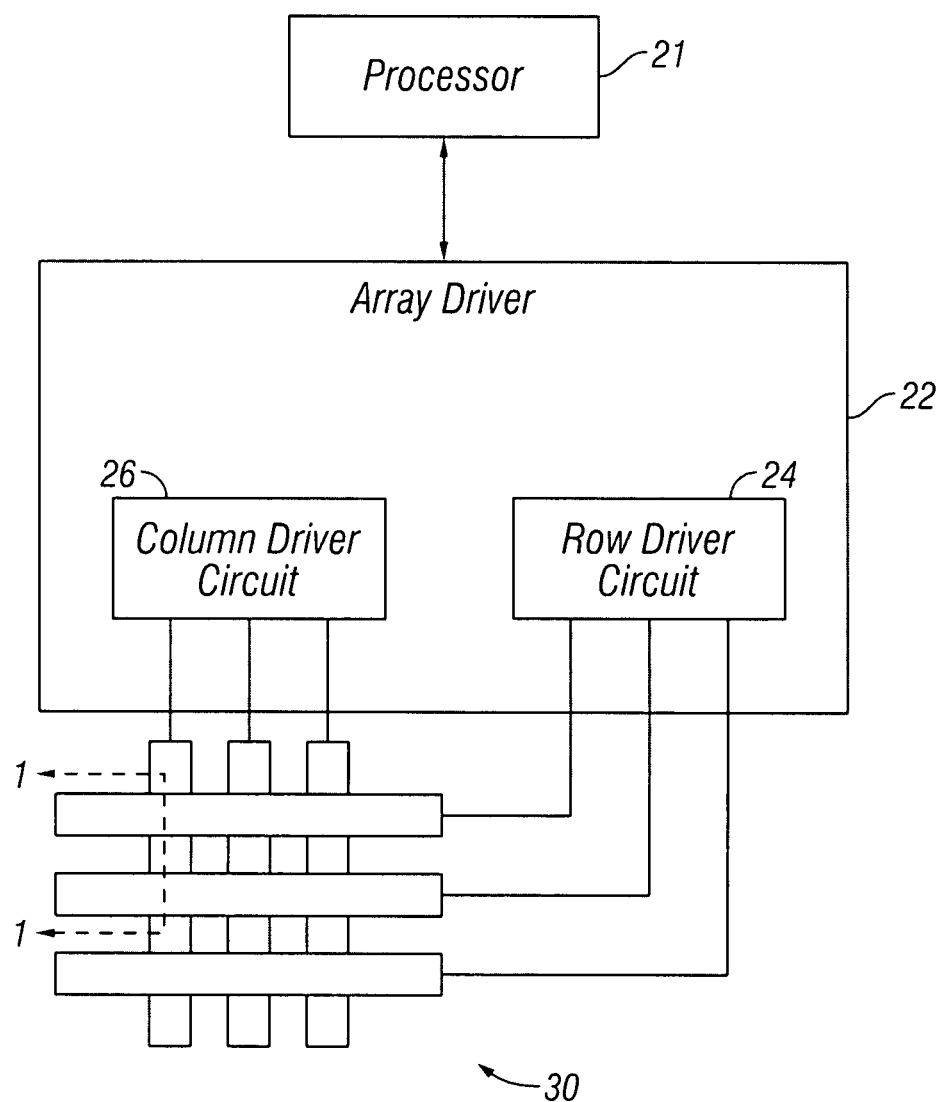
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. Thus, there exists a window of applied voltage, about 3 to 7 V in the example illustrated in FIG. 3, within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
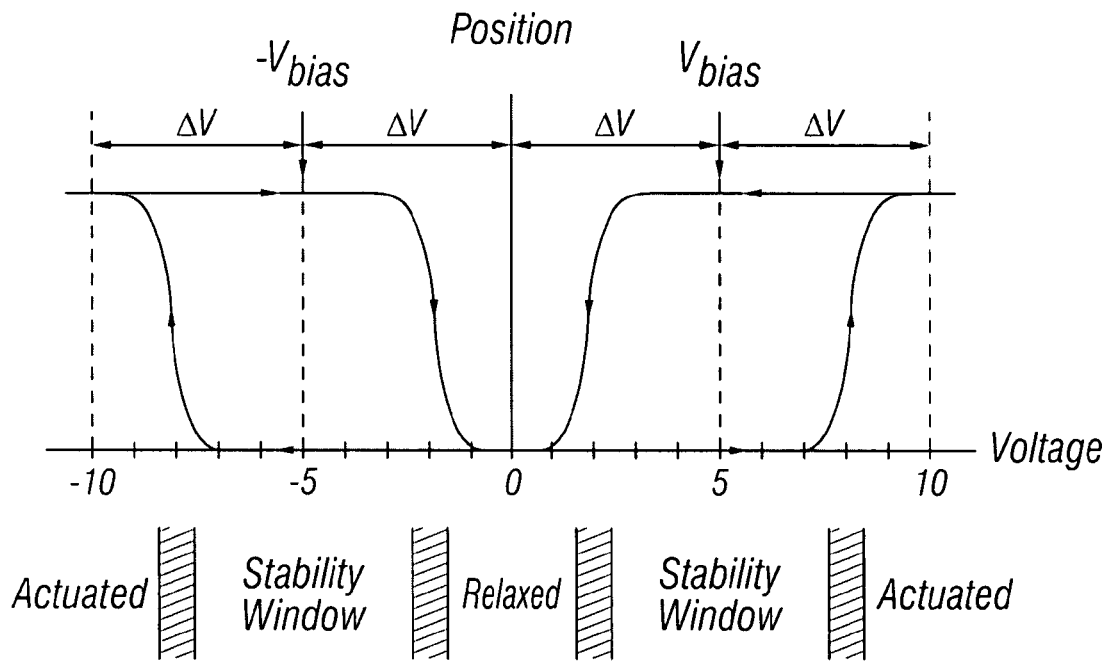
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.
Figure 5A:
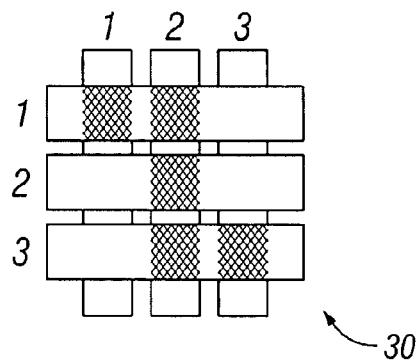
FIG. 5A illustrates one exemplary frame of display data in the 3×3 interferometric modulator display of FIG. 2.
Figure 5B:
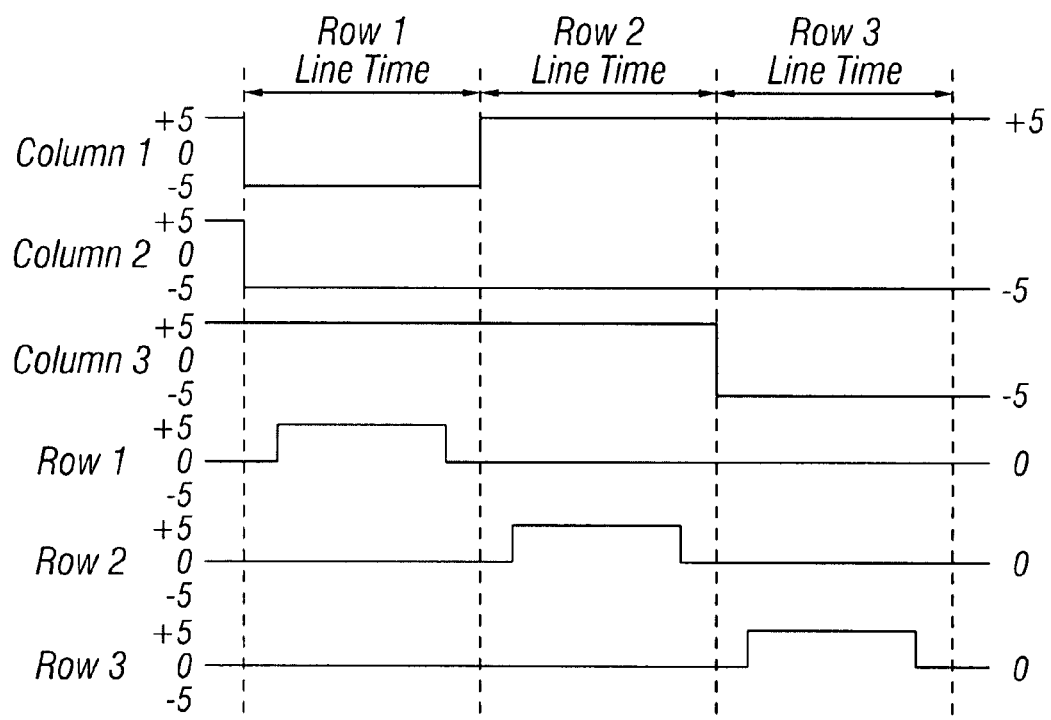
FIG. 5B illustrates one exemplary timing diagram for row and column signals that may be used to write the frame of FIG. 5A.

FIGS. 4, 5A, and 5B illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to $-5$ volts and $+5$ volts, respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
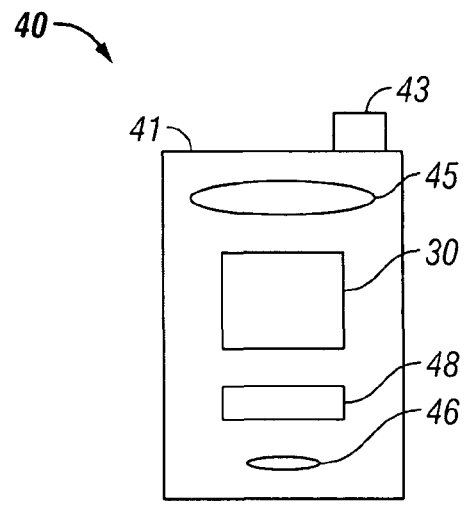
FIGS. 6A and 6B are system block diagrams illustrating an embodiment of a visual display device comprising a plurality of interferometric modulators.
Figure 6B:
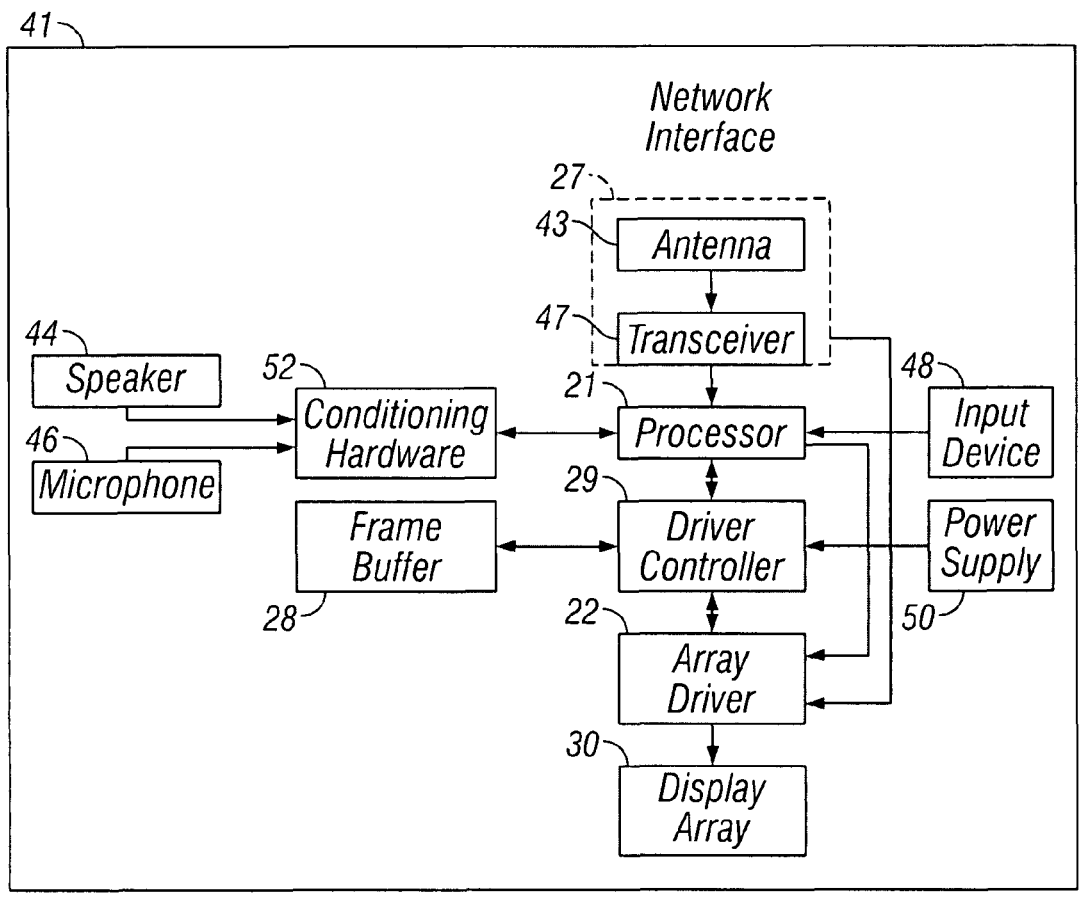

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes as are well known to those of skill in the art, including injection molding and vacuum forming. In addition, the housing 41 may be made from any of a variety of materials, including, but not limited to, plastic, metal, glass, rubber, and ceramic, or a combination thereof. In one embodiment, the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43, which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28 and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one or more devices over a network. In one embodiment, the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS, or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, or a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell including a plastic solar cell, and solar-cell paint. In another embodiment, power supply 50 is configured to receive power from a wall outlet.

In some embodiments, control programmability resides, as described above, in a driver controller which can be located in several places in the electronic display system. In some embodiments, control programmability resides in the array driver 22. Those of skill in the art will recognize that the above-described optimizations may be implemented in any number of hardware and/or software components and in various configurations.

Figure 7A:
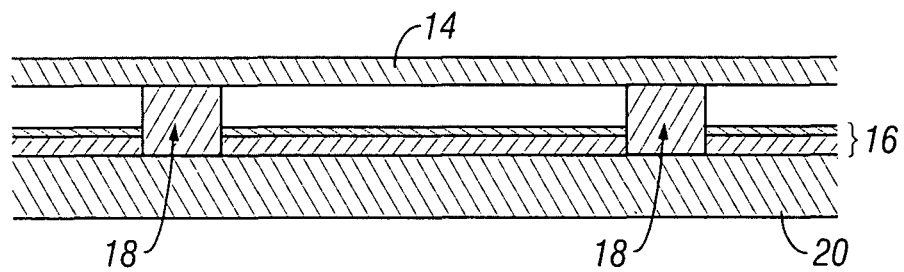
FIG. 7A is a cross section of the device of FIG. 1.
Figure 7B:
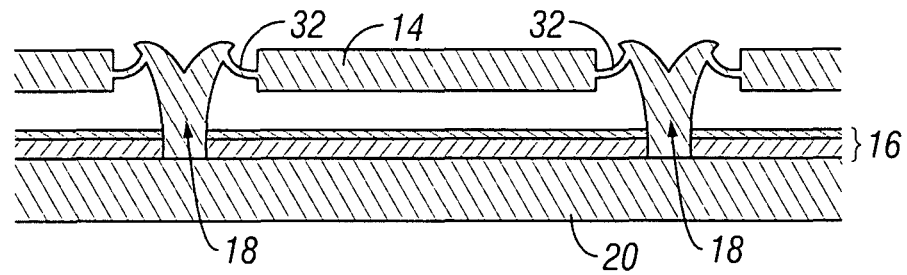
FIG. 7B is a cross section of an alternative embodiment of an interferometric modulator.
Figure 7C:
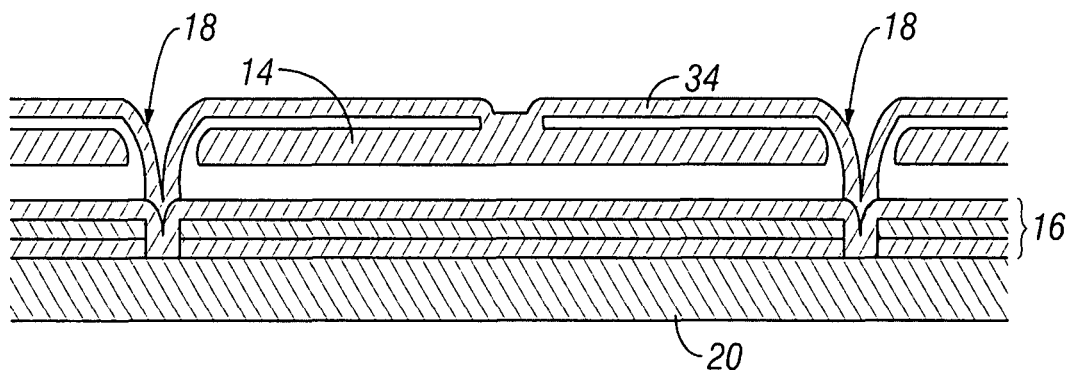
FIG. 7C is a cross section of another alternative embodiment of an interferometric modulator.
Figure 7D:
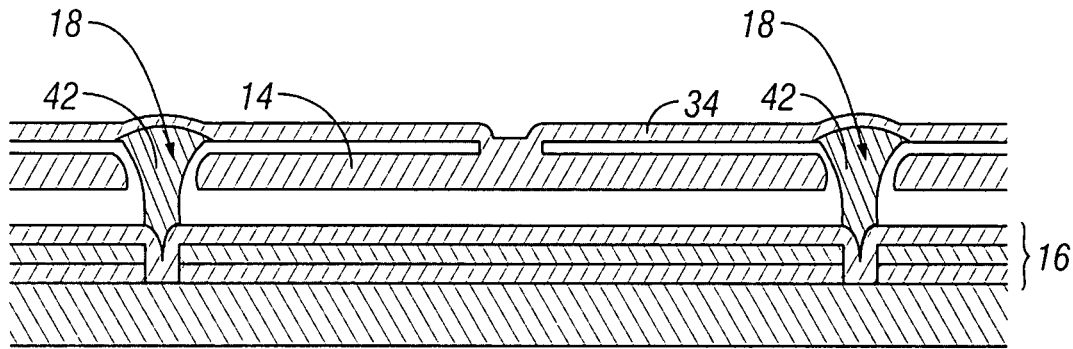
FIG. 7D is a cross section of yet another alternative embodiment of an interferometric modulator.
Figure 7E:
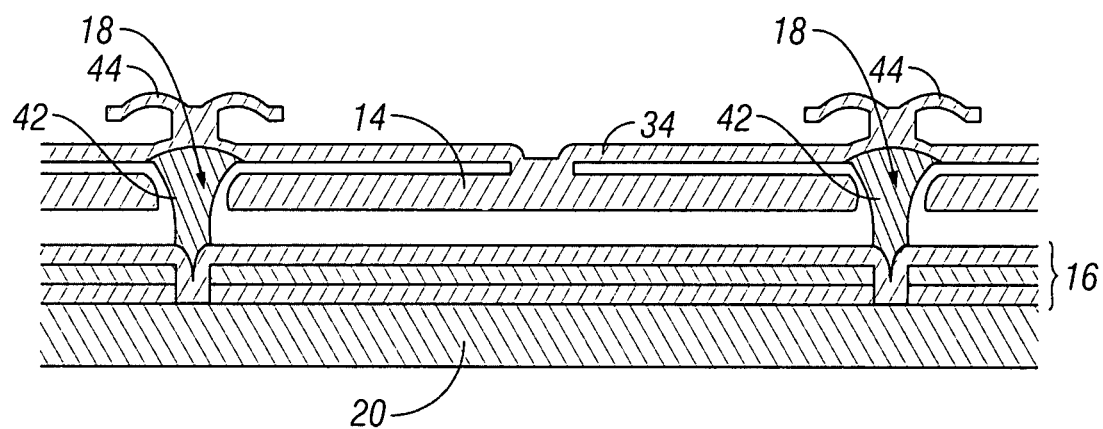
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the gap, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C, as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. Such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

An internal source of illumination may be provided for illumination of reflective display devices in dark ambient environments. In certain embodiments, integration of an illumination source in display devices comprising a plurality of display elements (e.g., interferometric modulators) includes laminating a film or film stack providing some or all of the optical functions to a substrate. Light can be injected into this film or film stack and can propagate therein across the face of the display device. In certain embodiments, for example, a light guide film or film stack may be laminated to a substrate using a light-diffusive pressure-sensitive adhesive (PSA). The light guide film or film stack forms a "light guide" having an "optical propagation region" into which light is injected and through which the light propagates along the length of the light guide. In certain embodiments, the optical propagation region comprises a light guide film or film stack and does not include the substrate. In other embodiments, the optical propagation region comprises a light guide film or film stack and a substrate. Regardless of the particular configuration, the optical propagation region includes upper and lower interfaces that reflect light incident thereon at grazing incidence to support the propagation of light along the length of the light guide. In some embodiments, the light guide includes a "turning film" (e.g., "prismatic film") that forms the upper interface distal to the display elements that is configured to reflect (or "turn") rays propagating in the light guide towards the display elements.

When the optical propagation region is immediately adjacent to display elements of a display device, the reflectivity of light rays directed at grazing incidence onto the lower interface between the optical propagation region and the display elements may be disadvantageously reduced. Such reduced reflectivity can result in reduced illumination, color, contrast, and/or brightness uniformity of the display device. Accordingly, in some embodiments, an optical isolation layer is introduced between the optical propagation region and the display elements in order to increase the reflectivity of the light at grazing incidence. The upper and lower interfaces separate the light guide from two materials which have refractive indices smaller than the smallest refractive index of the elements comprising the optical propagation region. In this application, grazing incidence is defined for rays propagating inside the optical propagation region at an angle that is larger than the largest of the two angles describing total internal reflection ("TIR") at each of the two interfaces, so that at grazing incidence the propagating rays experience total internal reflection at both the upper and lower interfaces of the optical propagation region.

In various embodiments, the optical isolation layer is configured to reflect more than about 20%, about 25%, about 30%, about 35%, about 40%, about 45%, about 50%, about 55%, about 60%, about 65%, about 70%, about 75%, about 80%, about 85%, about 90%, about 95%, or higher of light incident on the optical isolation layer from within the optical propagation region at angles of incidence greater than about 40°, about 50°, about 55°, about 60°, about 65°, about 70°, about 75°, about 80°, about 85°, or higher relative to the normal to the lower interface of the optical propagation region. A "high" angle of incidence is, in some embodiments, at or above the largest TIR angle corresponding to the two interfaces (e.g., about 68° if the two TIR angles are about 39° and 68°) whereupon reflection of the incident light approaches 100%. Light at "lower" angles is partly reflected and partly refracted when it interacts with one of the interfaces of the optical propagation region where the angle of incidence is smaller than the total internal reflection angle of said interface. Other combinations of reflectivity of the optical isolation layer and angles of incidence are also possible.

In some embodiments, in addition to providing relatively high reflectivity for light rays at grazing incidence, the optical isolation layer is adapted to provide high transmittance of light rays at low angles of incidence (e.g., at the upper and/or lower interfaces). Thus, light, for example redirected by a turning film or originating from the ambient, can pass freely through the optical isolation layer and into the display elements with reduced reflection from the surfaces of the optical isolation layer. In certain such embodiments, light from the display elements (e.g., reflected by interferometric modulators) can pass freely through the optical isolation layer and through the surfaces thereof without substantial Fresnel reflection (e.g., less than about 4%, 3%, 2%, 1%, 0.5%, 0.3%, 0.1%, etc.).

Figure 8A:
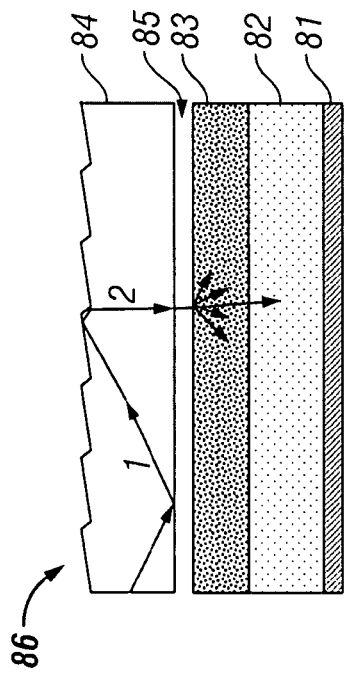
FIG. 8A is a cross section of a portion of a display device comprising a light guide adjacent to a diffuser.

Interferometric modulators are generally specular in nature, so certain embodiments of display devices comprising interferometric modulators preferably comprise a light diffusive element (or "diffuser"). When a diffuser or other optical loss structure is adjacent to an optical light guide, light propagating through the light guide at grazing incidence, e.g., at angles greater than 40° (the "light guided modes"), which should be reflected within the light guide by total internal reflection, may instead be scattered one or multiple times and redirected into non-light guided modes, or absorbed due to the intrinsic material absorption of certain elements inside the optical system with which light may interact. FIG. 8A schematically illustrates a cross-sectional portion of a display device 80 comprising an array of display elements 81 (e.g., interferometric modulators), a substrate 82 (e.g., comprising glass, plastic, etc.), an optical loss layer or structure 83 (e.g., comprising a diffuser, an absorber, a polarizer, a color filter, etc.), and a light guide 84. Because the light guide 84 is immediately adjacent to the optical loss layer 83, the reflectivity of light rays at grazing incidence on a lower interface of the optical propagation region between the light guide 84 and the optical loss layer 83 can be disadvantageously reduced. An example of the undesired effects that may be caused by adjacent optical loss layers 83 is that the light propagating in the light guide 84 may interact with an optical loss layer 83 having scattering properties, which may reduce the total amount of useful light carried by the light guide. Additionally, rays may be scattered at angles that are absorbed more strongly by certain components of the display device 80 (e.g., the display elements 81), which can reduce the illumination, brightness uniformity, color, and/or contrast of the display device 80. In the case where the display elements 81 comprise interferometric modulators, portions of the light scattered into the interferometric cavities may be absorbed regardless of the state of the interferometric modulators, which can result in a loss of light that reduces the brightness, uniformity, color, and/or contrast of the display device 80. The presence of an optical loss layer 83 directly adjacent to the light guide 84 can thereby cause unwanted scattering, which can disrupt the light propagation, or cause unwanted absorption, which can reduce uniformity and/or brightness.

Figure 8B:
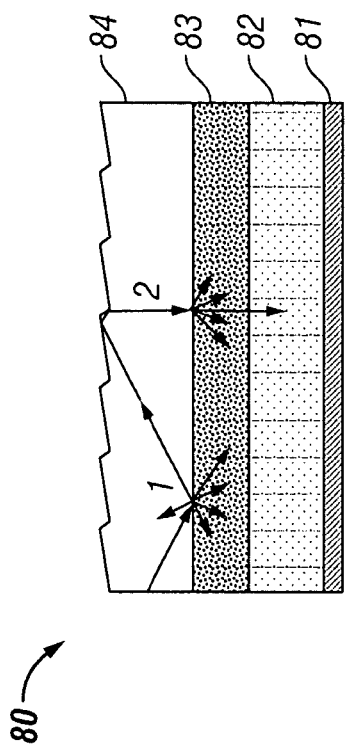
FIG. 8B is a cross section of a portion of a display device comprising a light guide spaced from a diffuser by an air gap.

One way to increase the internal reflection of light propagating at angles of grazing incidence is to provide an air gap between the optical loss layer 83 and the light guide 84. FIG. 8B illustrates a portion of a display device 86 in which the optical loss layer 83 is separated from the light guide 84 by an air gap 85. The index of refraction of air is 1.0, which is less than the index of refraction of the light guide 84. Thus, light propagating through the light guide 84 at grazing incidence undergoes total internal reflection and does not interact with an adjacent optical loss layer 83. The light may thus reflect back into, and propagate through, the light guide 84, thereby providing a more illuminated display device 86. However, an air gap 85 can increase the thickness of the display device 86 (e.g., by several hundred microns (μm)) and can reduce the contrast of the display device 86. Forming the air gap 85 may involve increased complexity. Additionally, one or more antireflective coatings on one or more sides of the air gap 85 may be required (e.g., to achieve a certain contrast level), thereby significantly increasing the costs of manufacturing.

Accordingly, in some embodiments, an optical isolation layer (or "optical isolation region") comprising a film or a material is introduced between the optical propagation region and the optical loss layer (e.g., the diffuser) in order to increase the reflectivity of the light rays at grazing incidence. In various embodiments in which the index of refraction of the material of the optical isolation layer is different (e.g., lower) than the index of refraction of the optical propagation region, an interface between the optical propagation region and the optical loss layer total internally reflects light incident thereon at grazing angles (e.g., angles greater than the critical angle).

In certain embodiments, the optical propagation region comprises a planar or substantially flat light guide and the optical isolation layer is immediately adjacent to the light guide. In various embodiments, the optical isolation layer is adapted to reflect more than about 20%, about 25%, about 30%, about 35%, about 40%, about 45%, about 50%, about 55%, about 60%, about 65%, about 70%, about 75%, about 80%, about 85%, about 90%, about 95%, or higher of light incident on the optical isolation layer from within the optical propagation region at angles greater than about 40°, about 50°, about 55°, about 60°, about 65°, about 70°, about 75°, about 80°, about 85°, or higher relative to normal to the lower interface of the optical propagation region. In certain embodiments, the optical isolation layer is adapted to reflect more than about 40% of light incident on the lower interface at angles greater than about 70° relative to normal to the optical propagation region. In various embodiments, the optical isolation layer is preferably between about 100 nanometers (nm) and 100 μm, more preferably between about 100 nm and 10 μm, or even more preferably between about 100 nm and 3 μm. Other thicknesses are also possible.

In some embodiments, in addition to providing relatively high reflectivity for light rays at grazing incidence, the optical isolation layer is adapted to provide high transmittance of light rays at low angles of incidence at the lower interface. In embodiments in which the index of refraction of the material of the optical isolation layer is substantially close to, but is less than, the index of refraction of the optical propagation region, the interface between the optical propagation region and the optical loss layer is essentially transparent for light incident thereon at lower angles (e.g., angles close to normal to the interface, such as turned towards the interface by a turning film or from the ambient) and has reduce Fresnel reflection. Thus, light, for example redirected by a turning film at the upper interface or from the ambient propagating through the upper interface, can pass freely through the lower interface. In certain embodiments, light, for example redirected by a turning film on an upper interface or from the ambient propagating through the upper interface, can pass freely through the lower interface of the optical isolation layer and into display elements proximate to a side of the lower interface. In certain such embodiments, light from the display elements (e.g., reflected by interferometric modulators) can pass freely through the optical isolation layer and through the upper interface.

In certain embodiments, decoupling an optical loss layer (e.g., a diffusing layer or absorbing layer) from an optical propagation region without utilizing an air gap (e.g., using instead an optical isolation layer) can advantageously increase the amount of light that propagates through the optical propagation region without substantially increasing thickness or significantly increasing the costs of manufacturing. By allowing light to propagate through an optical propagation region without losses due to an adjacent optical loss layer, the performance of the optical propagation region can be increased tremendously compared to illumination apparatuses in which the optical loss layer is directly optically coupled to the optical propagation region. Moreover, such embodiments allow the efficient integration of a diffuser with a light guide, thereby enabling development of a light guide that performs independently of the state of the underlying display elements and/or optics. Other examples of optical parameters that can be changed without affecting the performance of the light guide include, for example, optical buffering the interferometric modulator, differences in the reflectivity of the interferometric modulator of different architectures, varying display content and brightness level, etc. Accordingly, the light guide can be treated as a "drop-in" module because the optical functionality of the light guide is decoupled from the state of the array of display elements onto which it is laminated or added. Although described herein largely in terms of diffusers for display devices comprising interferometric modulators and light guides, it will be appreciated that an illumination apparatus comprising an optical propagation region decoupled from an optical loss region (e.g., including polarizers, diffusers, color filters, absorbers, and the like) may be applied to a wide variety of display technologies (e.g., reflective liquid crystal, transmissive liquid crystal, transflective liquid crystal, electrophoretic, etc.).

When not optically decoupled from the optical propagation region, a diffuser can be responsible for a loss of optical energy in the optical propagation region (e.g., greater than about 25%, greater than about 50%, greater than about 75%, etc. depending on the length of the display device, the thickness of the diffuser, the thickness of the optical propagation region, and light diffusion strength (i.e., Haze level). However, the practical benefits of optically decoupling an optical propagation region from an optical loss layer is even higher because the combined optical losses of the light guided modes to both the optical loss layer (e.g., diffuser, absorbing layer) as well as the display elements (e.g., interferometric modulators) can be very severe, and decoupling the optical propagation region (e.g., light guide film or film stack, light guide plus substrate, etc.) from the optical isolation layer implicitly decouples the optical propagation region from the display elements, as well.

Figure 9A:
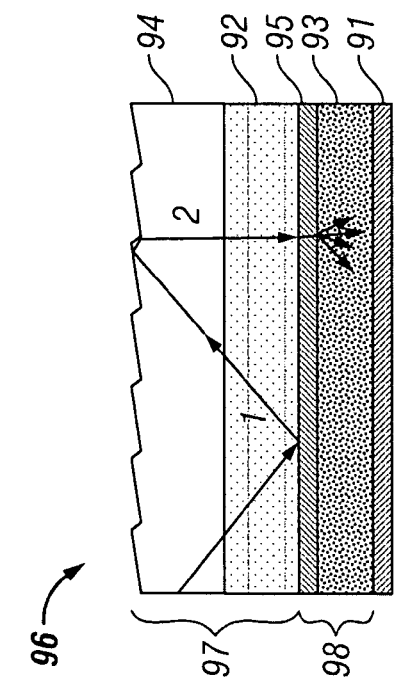
FIG. 9A is a cross section of a portion of an example embodiment of a display device comprising an optical propagation region of a light guide decoupled from a diffuser by an optical isolation layer.

FIG. 9A illustrates a portion of a display device 90 comprising an array of display elements 91 (e.g., interferometric modulators), a substrate 92 (e.g., comprising glass, plastic, etc.), and an illumination apparatus comprising an optical loss layer 93 (e.g., comprising a diffuser, an absorber, a polarizer, a color filter, etc.), and an optical propagation region 97 comprising a light guide 94. In certain embodiments, the substrate 92 provides a means for supporting the display elements 91 and/or certain other layers during fabrication of the display elements 91. The illumination apparatus of the display device 90 further comprises an optical isolation layer 95 between the optical propagation region 97 and the optical loss layer 93. The optical isolation layer 95 comprises a material. In some embodiments, the material is a solid. In some embodiments, the material is a liquid (e.g., a viscous liquid). In some embodiments, the material is gel-like. The optical isolation layer 95 is configured such that light propagating through the optical propagation region 97 at grazing incidence does not interact with the optical loss layer 93, but also such that light propagating through the optical propagation region 97 at low angles (e.g., due to being turned towards the array of display elements 91 by a turning film of the light guide 94 or from the ambient) may interact with the optical loss layer 93, the substrate 92, and the array of display elements 91.

Integrating the optical isolation layer 95 within the display device 90 allows it to be formed before, during, and/or after manufacture of the display elements 91 on the substrate 92. For example, in manufacturing an interferometric modulator display, the optical loss layer 93 may be deposited onto the substrate 92 as a first step of the manufacturing. It will be appreciated that the substrate 92 can act as a means for supporting the display elements 91 and/or certain other layers during fabrication in such embodiments. Coating processes including spin coating, blade coating, spray coating, fluid dispensing, film coating, etc. may be employed. Deposition may be by suitable deposition techniques, including, but not limited to, chemical vapor deposition (CVD) and/or physical vapor deposition (PVD). The optical loss layer 93 may also be laminated to the substrate 92 in certain embodiments. In some embodiments, the optical isolation layer 95 is applied onto the light guide 94, and then the stack including the optical isolation layer 95 and the light guide 94 is applied onto the substrate 92. Pressure sensitive adhesive may be used. In some embodiments in which the optical loss layer 93 comprises a diffuser, the diffuser comprises an adhesive matrix with scatter particles incorporated therein.

The optical isolation layer 95 may be formed on the optical loss layer 93. For example, in manufacturing an interferometric modulator display, the optical isolation layer 95 may be deposited or applied onto the optical loss layer 93 on the substrate 92. It will be appreciated that the substrate 92 can act as a means for supporting the display elements 91 and/or certain other layers during fabrication in such embodiments. In embodiments in which the optical isolation layer 95 comprises multiple layers of material, each layer may be sequentially deposited.

The optical isolation layer 95 may also be integrated with the optical loss layer 93, for example in the structure 98 of FIG. 9A and the structure 118 described below with respect to FIG. 11. For example, in manufacturing an interferometric modulator display, the integrated structure 98 comprising the optical isolation layer 95 and the optical loss layer 93 may be deposited onto the opposite side of the substrate 92 as the display elements 91. It will be appreciated that the substrate 92 can act as a means for supporting the display elements 91 and/or certain other layers during fabrication in such embodiments. In some embodiments, the integrated structure 98 is applied onto the light guide 94, and then the stack including the integrated structure 98 and the light guide 94 is applied onto the substrate 92 or onto a display device comprising the substrate 92 and display elements 91. In some embodiments, the integrated structure 98 has dual optical functionality: optical isolation and optical loss. In certain such embodiments, the integrated structure 98 comprises a multi-functional pressure sensitive adhesive which attaches the light guide 94 to the side of the substrate 92 that is opposite from the display elements side 91.

After formation of the optical isolation layer 95, ordinary deposition and patterning steps used to form display elements (e.g., interferometric modulators, as described above) may be performed to fabricate the display elements 91 on the other side of the substrate 92, which can be used for structural support of the display elements 91 and/or certain other layers during fabrication. Upon completion of manufacturing the display elements 91, the light guide 94 may be attached (e.g., laminated, embossed, applied, etc.) to the opposite side of the substrate 92 on the optical isolation layer 95. For example, the light guide 94 including a turning film may be laminated onto the substrate 92. For another example, the light guide 94 may be attached by first laminating a base film (or layer or multi-layer stack) to the substrate 92 and subsequently laminating a prismatic film to the base film. For yet another example, the light guide 94 may be attached by first laminating a prismatic film onto a base film (or layer or multi-layer stack) and subsequently laminating the base film with the prismatic film thereon onto the substrate 92. In other embodiments, a different order of steps may be used. For example, in some embodiments, the display elements 91 (e.g., interferometric modulators) can be formed prior to either or both the optical loss layer 93 and the optical isolation layer 95. Other variations are also possible.

Figure 9B:
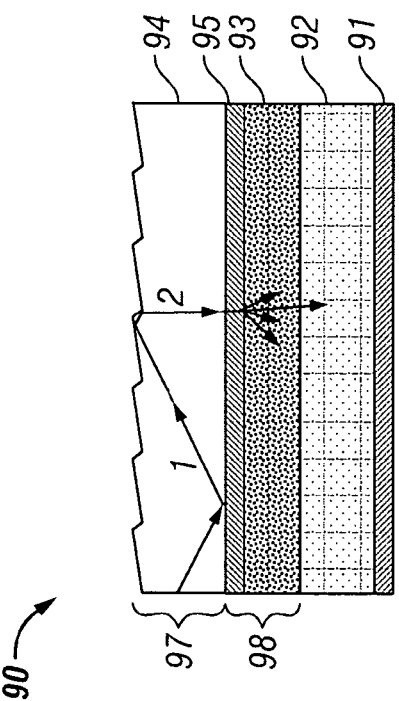
FIG. 9B is a cross section of a portion of another example embodiment of a display device comprising an optical propagation region, which is formed by a light guide and a substrate, decoupled from a diffuser by an optical isolation layer.

FIG. 9B illustrates a portion of a display device 96 comprising an array of display elements 91 (e.g., interferometric modulators), and an illumination apparatus comprising a substrate 92 (e.g., comprising glass, plastic, etc.), an optical loss layer 93, and a light guide 94. In such an embodiment, the optical propagation region 97 comprises the light guide film or film stack 94 and the substrate 92. In certain embodiments, the substrate 92 provides a means for supporting the display elements 91 and/or certain other layers during fabrication of the display elements 91. The optical loss layer 93 is adjacent to the array of display elements 91, so the optical isolation layer 95 is between the substrate 92 and the optical loss layer 93. As such, the embodiment illustrated in FIG. 9B also comprises an optical propagation region 97 decoupled from an optical loss layer 93 and consequently also decoupled from the display elements 91.

In certain embodiments, an illumination apparatus comprising a substrate 92 (e.g., comprising glass, plastic, etc.), an optical loss layer 93, and a light guide 94. Such an apparatus would look like FIG. 9B if the optical isolation layer 95 was removed and if the substrate 92 was thus adjacent to the optical loss layer 93. The substrate 92 is disposed between the optical loss layer 93 and the light guide 94 such that the substrate 92 acts as an optical isolation layer. For example, the substrate 92 is configured such that light propagating through the optical light guide 94 at grazing incidence does not interact with the optical loss layer 93, but also such that light propagating through the light guide 94 at low angles may be transmitted through with the optical loss layer 93, the substrate 92, and be incident on the array of display elements 91. In such embodiments, the substrate 92 comprises a material having an index of refraction that is lower than the index of refraction of the light guide 94. For example, in embodiments in which the light guide 94 has an index of refraction of about 1.59, the substrate 92 may comprise quartz (having an index of refraction of about 1.45), aluminosilicate display glass (having an index of refraction of about 1.52), etc. As discussed below with respect to FIG. 10C, as the difference between the indices of refraction of the light guide 94 and the optical isolation layer, which is the substrate 92 in this embodiment, increases, the range of angles of incidence that may be totally internally reflected increases. In such embodiments, the separate optical isolation layer 95 discussed above may be eliminated and the substrate may be used as the optical isolation layer, advantageously reducing costs. However, embodiments including a separate optical isolation layer 95 may provide more flexibility in selection of materials.

As described above, integrating the optical isolation layer 95 within the display device 96 allows it to be formed before, during, and/or after manufacture of the display elements 91 on the substrate 92. In certain embodiments, the optical isolation layer 95 is formed on the light guide 94 so that the entire stack above the substrate 92 can be applied in one step to produce the display device 96. In certain embodiments of manufacturing an interferometric modulator display device, the optical isolation layer 95 is deposited onto the substrate 92 before the light guide 94 is applied onto the substrate 92. It will be appreciated that the substrate 92 can act as a means for supporting the display elements 91 and/or certain other layers during fabrication in such embodiments. In embodiments in which the optical isolation layer 95 comprises multiple layers of material (e.g., a plurality of films), each layer may be sequentially deposited. After formation of the optical isolation layer 95, the optical loss layer 93 may be disposed on the optical isolation layer 95 using deposition or lamination techniques, for example, as described above. After formation of the optical loss layer 93, ordinary deposition and patterning steps used to form display elements (e.g., interferometric modulators, as described above) may be performed to fabricate the display elements 91 on the optical loss layer 93. The light guide 94 may be attached (e.g., laminated, embossed, applied, etc.) on the opposite side of the substrate 92 either before, after, or during manufacturing the display elements 91. For example, the light guide 94 including a turning film may be laminated onto the substrate 92. For another example, the light guide 94 may be attached by first laminating a base film (or layer or multi-layer stack) to the substrate 92 and subsequently laminating a prismatic film to the base film. For yet another example, the light guide 94 may be attached by first laminating a prismatic film onto a base film (or layer or multi-layer stack) and subsequently laminating the base film with the prismatic film thereon onto the substrate 92. Other variations are also possible. After formation of the light guide 94 (e.g., by attachment), the light guide 94 and the substrate 92 form the optical propagation region 97. Other approaches are possible. In certain embodiments, for example, the optical loss layer and/or the optical isolation layer are formed after forming the display elements (e.g., interferometric modulators).

As described above for the structure 98 of FIG. 9A, the optical isolation layer 95 may be integrated with the optical loss layer 93, for example in the structure 98 of FIGS. 9A and 9B and the structure 118 described below with respect to FIG. 11. For example, in manufacturing an interferometric modulator display, the optical isolation layer integrated with the optical loss layer 98 may be deposited onto the same side of the substrate 92 as the display elements 91. It will be appreciated that the substrate 92 can act as a means for supporting the display elements 91 and/or certain other layers during fabrication in such embodiments.

Figure 10A:
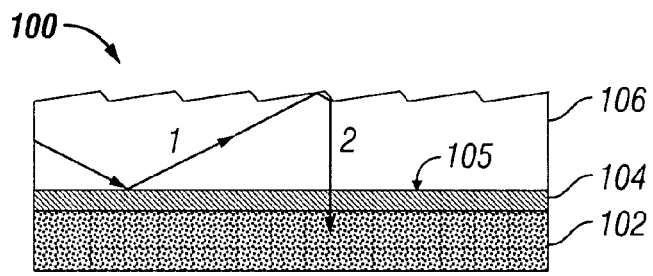
FIG. 10A is a cross section of the embodiment of FIG. 9A comprising an optical propagation region decoupled from an optical loss layer (e.g. diffuser) by an optical isolation layer.

FIG. 10A illustrates a portion of an example embodiment of an illumination apparatus 100 comprising an optical isolation layer 104 between an optical propagation region 106 and an optical loss layer 102. The optical loss layer 102 may comprise a diffuser, color filter, absorber, polarizer, or other type of layer. The optical isolation layer 104 comprises a material. In some embodiments, the material is a solid. In some embodiments, the material is a liquid (e.g., a viscous liquid). In some embodiments, the material is gel-like. In some embodiments, the optical isolation layer 104 comprises a substrate. The optical propagation region 106 may comprise, for example, a light guide (e.g., as illustrated in FIG. 9A), a light guide and a substrate (e.g., as illustrated in FIG. 9B), a light guide with a turning film laminated thereon, adhesive layers, and the like. When the optical propagation region 106 comprises a light guide film, the light guide film may comprise a material such as polycarbonate, glass (e.g., aluminosilicate, borosilicate, etc.), and the like. Polycarbonate has an index of refraction of about 1.59 at wavelengths in the visible spectrum, and glass typically has an index of refraction of about 1.52 at visible wavelengths. In order to increase the reflection (e.g., by enabling total internal reflection) of light rays at grazing incidence into the optical propagation region 106, the optical isolation layer 104 has an index of refraction that is lower than the index of refraction of the optical propagation region 106. The difference in indices of refraction between the optical propagation region 106 and the optical isolation layer 104 causes light rays at grazing incidence to be totally internally reflected from the lower interface 105 between the optical propagation region 106 and the optical isolation layer 104. Thus, when the optical propagation region 106 comprises polycarbonate, the optical isolation layer 104 may have an index of refraction lower than about 1.59, and when the optical propagation region 106 comprises glass, the optical isolation layer 104 may have an index of refraction lower than about 1.52. The optical isolation layer 104 may, for example, comprise silicones (e.g., optically clear silicone-based adhesives) having indices of refraction between 1.4 and 1.45, nanoporous glassy materials (e.g., nanoporous silica, spin-on glasses, etc.) having indices of refraction between 1.4 and 1.45, fluoropolymers (e.g., amorphous transparent fluoropolymers such as DuPont NC-211) having good adhesion to glass and plastics and indices of refraction between about 1.3 and 1.4, and others (e.g., aerogels having indices of refraction less than about 1.2 and acrylate-based materials having indices of refraction of about 1.47). Acrylate-based materials are preferred for low costs and ease of integration, but materials with an index of refraction that is substantially less than the index of refraction of the optical propagation region 106 (e.g., having an index of refraction difference of about 0.1 or more) are preferred for optical characteristics, as described below with respect to FIG. 10C. Other materials can also be used.

Light propagating through the material of the optical isolation layer 104 at low angles of incidence (e.g., due to being turned by a light turning film of the optical propagation region 106 or from the ambient) preferably loses less than about 4% of its intensity or flux, more preferably loses less than about 2% of its intensity or flux, even more preferably loses less than about 1% of its intensity or flux, still more preferably loses less than about 0.6% of its intensity or flux, yet still more preferably loses less than about 0.2% of its intensity or flux, or yet even still more preferably loses less than about 0.1% of its intensity or flux. This loss may be due, for example, to Fresnel reflection as a result of the mismatch in index of refraction. It will be appreciated that the greater the difference in indices of refraction between the optical isolation layer 104 and the optical propagation region 106, the greater the amount of reflectance of light at low angles of incidence. For example, a polycarbonate optical propagation region 106 (having an index of refraction of about 1.59) coupled to an acrylate-based optical isolation layer 104 (having an index of refraction of about 1.47) has a polarization-averaged reflectivity of about 0.2%, a polycarbonate optical propagation region 106 coupled to a silicone optical isolation layer 104 (having an index of refraction of about 1.41) has a polarization-averaged reflectivity of about 0.4%, a polycarbonate optical propagation region 106 coupled to a fluoropolymer optical isolation layer 104 (having an index of refraction of about 1.37) has a polarization-averaged reflectivity of about 0.6%, and a polycarbonate optical propagation region 106 coupled to a plastic optical isolation layer 104 (having an index of refraction of about 1.3) has a polarization-averaged reflectivity of about 1%, but a polycarbonate optical propagation region 106 coupled to an aerogel optical isolation layer 104 (having an index of refraction of about 1.2) has a polarization-averaged reflectivity of about 2%. In order to increase the amount of flux into the display elements when using an aerogel optical isolation layer 104, the material that comprises the optical isolation layer 106 may be modified. For example, polymethyl methacrylate (PMMA) has an index of refraction of about 1.47, which, coupled to an aerogel optical isolation layer 104 has a polarization-averaged reflectivity of about 1%. Moreover, a PMMA optical propagation region 106 coupled to a fluoropolymer optical isolation layer 104 has a polarization-averaged reflectivity of about 0.1%. By contrast, in an illumination apparatus comprising an air gap 85 between the optical propagation region 84 and the optical loss layer 83 (e.g., as illustrated in FIG. 8B), light propagating through the air gap 85 at low angles of incidence (e.g., due to being turned by a light turning film of the optical propagation region 84 or from the ambient) loses at least about 5.2% of its intensity or flux each time it crosses the interface between a polycarbonate light guide 84 (having an index of refraction of about 1.59) and the air gap 85 (having an index of refraction of about 1.0).

Figure 10B:
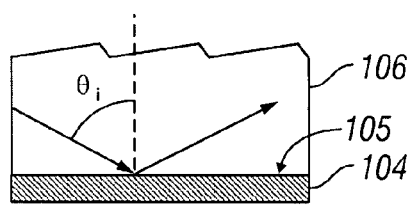
FIG. 10B illustrates an example ray of light propagating through an optical propagation region of the light guide at an angle of incidence, $\theta_i$.

FIG. 10B illustrates an angle of propagation, $\theta_i$, (e.g., angle of incidence) propagating through an optical propagation region 106. The angle of incidence, $\theta_i$, is the angle from the normal to an interface 105 between the optical propagation region 106 and the optical isolation layer 104. Light at angles of grazing incidence are typically larger than about 40° from said normal to the interface.

Figure 10C:
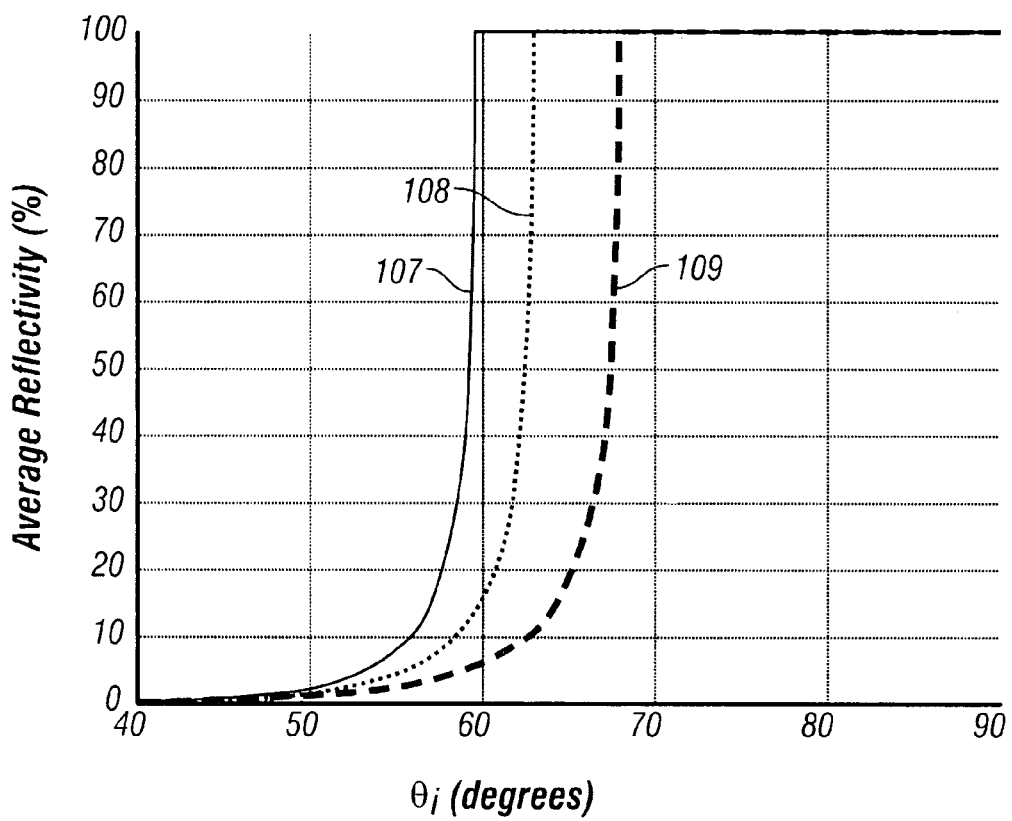
FIG. 10C illustrates the average reflectivity at different angles of incidence for different example optical isolation layers.

In some embodiments, the material of the optical isolation layer 104 is selected at least in part by modeling with Fresnel equations, which describe the reflectivity between materials having different indices of refraction at different angles and light polarizations. FIG. 10C depicts the average reflectivity for S and P polarizations of various substances in accordance with certain embodiments of the illumination apparatus 100 of FIG. 10A, calculated for the interface with the smaller refractive index difference of the light guide (i.e., the interface 105 in embodiments in which the light guide 106 is adjacent to air at the interface comprising the turning features). Solid curve 107 depicts the average reflectivity of an optical propagation region 106 comprising polycarbonate having an index of refraction of about 1.59 and an optical isolation layer 104 comprising a fluoropolymer having an index of refraction of about 1.37. The difference in the indices of refraction is about 0.22 (1.59-1.37). The reflectivity for angles of incidence greater than about 58° is 100% and the reflectivity for angles of incidence below about 50° is nearly zero. Dotted curve 108 depicts the average reflectivity of an optical propagation region 106 comprising polycarbonate having an index of refraction of about 1.59 and an optical isolation layer 104 comprising silicone having an index of refraction of about 1.41. The difference in the indices of refraction is about 0.18 (1.59-1.41). The reflectivity for angles of incidence greater than about 62° is 100% and the reflectivity for angles of incidence below about 55° is nearly zero. Dashed curve 109 depicts the average reflectivity of an optical propagation region 106 comprising polycarbonate having an index of refraction of about 1.59 and an optical isolation layer 104 comprising an acrylate-based material having an index of refraction of about 1.47. The difference in the indices of refraction is about 0.12 (1.59-1.47). The reflectivity for angles of incidence greater than about 67° is 100% and the reflectivity for angles of incidence below about 60° is nearly zero. It will be appreciated that common fluoropolymers may not be easy to integrate into a certain display devices due to their low adhesion to glass and plastics. However, certain fluoropolymers (e.g., DuPont NC-211) have been developed that do have good adhesion to glass and plastics. As illustrated in FIG. 10C, as the difference between the indices of refraction of the optical propagation region 106 and the optical isolation layer 104 increases, the range of angles of incidence that may be totally internally reflected (i.e., the length of the straight portion of the curves 107, 108, 109 at 100% average reflectivity) increases. It is to be understood that the other interface of the light guide, assumed here to have a larger refractive index difference, exhibits a similar reflectivity behavior as function of incidence angle where total internal reflection starts at substantially smaller angles of incidence (e.g., 39° for polycarbonate-air) than the TIR angles shown in FIG. 10C (e.g., about 60° or larger). Certain embodiments of the present invention increase (e.g., maximize) the range of angles which experience TIR at the upper and lower interfaces of the light guide 106 while minimizing the sum of the reflections at angles close to normal to the upper and lower interfaces.

Although each of the curves 107, 108, 109 depicts the average reflectivity as asymptotically approaching about 0% at about 40°, it will be appreciated that the reflectivity may be affected by Fresnel reflection, as described above. Thus, the average reflectivity of the solid curve 107 at an angle of incidence of about 0° (i.e., normal incidence to the interface 105) is about 0.6%, the average reflectivity of the dotted curve 108 at an angle of incidence of about 0° is about 0.4%, and the average reflectivity of the dashed curve 109 at an angle of incidence of about 0° is about 0.2%. By contrast, the average reflectivity at an angle of incidence of about 0° of a curve depicting the average reflectivity of an optical propagation region 84 comprising polycarbonate having an index of refraction of about 1.59 and an air gap 85 having an index of refraction of about 1.0 at an angle of incidence of about 0° is about 5.2%. Thus, the loss of intensity or flux in such an illumination apparatus at such angles is disadvantageously large in comparison to illumination apparatus comprising an optical isolation layer comprising, for example, material having a higher index than air and that more closely matches the index of the optical propagation region, in addition to the problems associated with increased thickness and manufacturing costs discussed above.

Figure 11:
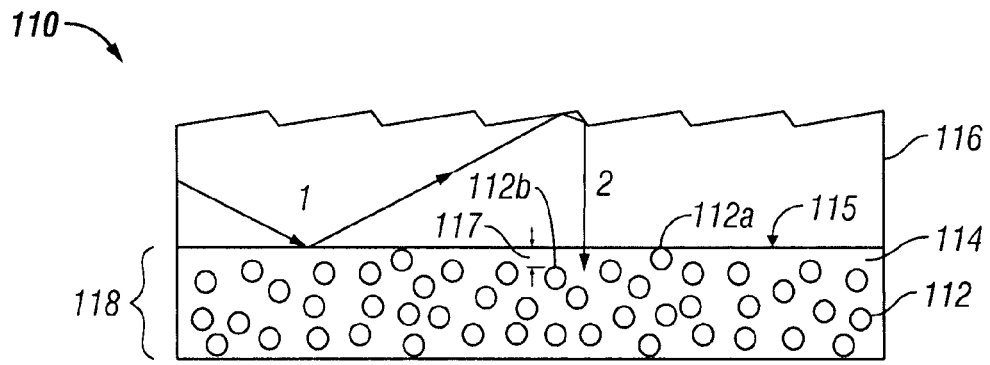
FIG. 11 is a cross section of a portion of another example embodiment of a display device wherein the optical loss layer and the an optical isolation layer are integrated together in a volume diffuser, optical isolation being provided by matrix material of the volume diffuser and optical loss being provided by scattering features in the matrix material.

FIG. 11 is a cross section of a portion of another example embodiment of an illumination apparatus 110 comprising an optical propagation region 116 decoupled from an optical loss layer by an optical isolation layer comprising an engineered volume diffuser 118. The optical propagation region 116 may comprise, for example, a light guide (e.g., as illustrated in FIG. 9A), a light guide and a substrate (e.g., as illustrated in FIG. 9B), a light guide with a turning film laminated thereon, adhesive layers, and the like. The volume diffuser 118 is engineered so that light at grazing incidence in the light guide 116 (e.g., the ray 1 in FIG. 11) is totally internal reflected and does not substantially interact with the diffuser 118, while light at lower incidence angles in the light guide 116 (e.g., ray 2 in FIG. 11) interacts with the diffuser 118 and is subsequently scattered. Thus, the engineered volume diffuser 118 can provide multiple optical functions: acting as an optical isolation layer for the light guide 116, reducing reflection for lower incidence light at the lower interface 115 of the light guide 116, and diffusing light turned by the light turning microstructure of the light guide 116 or originating from the ambient above the display 110. The engineered volume diffuser 118 comprises a base material (or "matrix") 114 and a filler (or "microstructure") 112 disposed therein.

In certain embodiments, the filler comprise particles or particulates or voids. These particulates or voids may have a size and/or geometry that scatters light. In some embodiments these particulates are absorbing. In various embodiments, for example, the particulates may absorb all of the visible spectrum and diffuse light. (In other embodiments, the particulates may absorb a portion of the visible spectrum and filter out color. In certain embodiments, the particulates are elongated and may be oriented similarly so as to polarize light.)

In some embodiments, the filler or microstructure 112 occupies about 10%, about 5%, or less by volume of the engineered volume diffuser 118. In certain embodiments, the base or matrix material 114 has an index of refraction lower than the index of refraction of the optical propagation region 116. Accordingly, the lower interface 115 between the optical propagation region 116 and the engineered volume diffuser 118 total internally reflects light incident thereon at grazing angles (e.g., angles greater than the critical angle relative to the interface 115 between the optical propagation region 116 and the matrix material 114 of the diffuser 118), while the interface 115 is essentially transparent for light incident thereon at higher angles (e.g., angles close to normal to the interface 115). In certain embodiments, the microstructure 112 has an index of refraction that is higher and/or lower than the index of refraction of the base material 114.

In some embodiments in which at least one microstructure 112a is not spaced from the interface 115, the feature 112a has an index of refraction lower than the index of refraction of the optical propagation region 116. Accordingly, the lower interface 115 between the optical propagation region 116 and the at least one microstructure 112a total internally reflects light incident thereon at grazing angles (e.g., angles greater than the critical angle), while the interface 115 is essentially transparent for light incident thereon at higher angles (e.g., angles close to normal to the interface 115). In certain embodiments, at least one microstructure 112a is not spaced from the interface 115, and the microstructure 112a does not have an index of refraction lower than the index of refraction of the optical propagation region 116. Accordingly, the light incident on the microstructure 112a at the lower interface at grazing angles (e.g., angles greater than the critical angle) may be affected. However, in embodiments in which a density of the features 112 is low such that there an area of microstructure 112a at the interface 115 is low with respect to the total area of the interface 115, such losses may be rendered insignificant (e.g., negligible).

In some embodiments in which at least one microstructure 112b is spaced from the interface 115, the volume diffuser 118 comprises an effective interface layer 117 (e.g., comprising material of the matrix 114) between the feature 112b and the interface 115. As the effective interface layer 117 becomes thicker, there is a reduced opportunity for interaction with the microstructures 112b. Accordingly, light incident on the interface 115 at grazing angles (e.g., angles greater than the critical angle) does not substantially interact with the microstructure 112b when the thickness of the layer 117 is sufficiently thick so that evanescent fields decay to negligible levels for the particular grazing angle. In some embodiments, a thickness of the layer 117 is less than about 0.5 µm. In some embodiments, a thickness of the layer 117 is less than about 1 µm. Other thicknesses are also possible and the thickness selected may in some embodiments depend on the indices of refraction of the optical propagation region 116 and the index of refraction of the matrix 114.

In some embodiments, the illumination apparatus 110 comprises an optical propagation region 116 including supplemental plastic films that are coated with a light diffusing coating and/or is fabricated on an interferometric modulator substrate glass. For example, in embodiments in which the optical propagation region 116 comprises a light guide (e.g., the optical propagation region 97 illustrated in FIG. 9A) and the optical isolation layer and optical loss layer are integrated in an engineered volume diffuser (e.g., the structure 98 illustrated in FIG. 9A or the structure 118 illustrated in FIG. 11), the diffuser may comprise a light-diffusive pressure sensitive adhesive (PSA). For another example, in embodiments in which the optical propagation region 116 comprises a light guide and a substrate (e.g., the optical propagation region 97 illustrated in FIG. 9B) and the optical isolation layer and optical loss layer are integrated in an engineered volume diffuser (e.g., the structure 98 illustrated in FIG. 9B or the structure 118 illustrated in FIG. 11), the diffuser may comprise a particle-filled glass-like material (an "in-glass diffuser") on the same side of the substrate as the display elements. Glass-like materials include glasses obtained by heat treatment of organosilicon spin-on glasses, glasses obtained by heat treatment of sol-gel type materials, powdered glass dispersed in a binder, and others. It will be appreciated that in embodiments in which the optical propagation region 116 comprises a light guide (e.g., the optical propagation region 97 illustrated in FIG. 9A) and the optical isolation layer and optical loss layer are integrated in an engineered volume diffuser (e.g., the structure 98 illustrated in FIG. 9A or the structure 118 illustrated in FIG. 11), the diffuser may also comprise an in-glass diffuser on the opposite side of the substrate as the display elements. In some embodiments, the illumination apparatus 110 comprises an optical propagation region 116 including interferometric modulator substrate glass and/or supplemental plastic films coated with a light diffusing formulation of an adhesive, such as a low-index PSA. Such embodiments may have reflectivity plots similar to those described above with respect to FIG. 10C for the base material 114 versus the optical propagation region 116.

The microstructures 112 may be any size or shape, and may be selected for certain properties of desired optical loss. As an example, the microstructures 112 may comprise light scattering features for embodiments in which the optical loss layer comprises an optical diffuser. As another example, the microstructures 112 may be configured to absorb light at certain wavelengths for embodiments in which the optical loss layer comprises a color filter. As yet another example, the microstructures 112 may be configured to absorb light at all visible wavelengths and a particular polarization for embodiments in which the optical loss layer comprises a diffuser or polarizer. In certain such embodiments, the microstructures 112 are elongated (i.e., having a length greater than a width) and may be oriented along a preferred global direction for embodiments in which the optical loss layer comprises a polarizer.

FIG. 11 also illustrates an illumination apparatus 110 comprising an optical propagation region 116 and a layer 118. The optical propagation region 116 may comprise a light guide (e.g., as illustrated in FIG. 9A), a light guide and a substrate (e.g., as illustrated in FIG. 9B), a light guide with a turning film laminated thereon, adhesive layers, and the like. The turning features are configured to redirect light out of the optical propagation region 116 towards the interface 115. The layer 118 includes a matrix material 114 and microstructures 112 disposed in a matrix 114 with an index of refraction less than the smallest index of refraction of the layers comprising the optical propagation region 116. Accordingly, the layer 118 is configured to increase an amount of light that is totally internal reflected in the optical propagation region 116. The layer 118 may comprise a diffuser, for example where the microstructures are configured to scatter light. The layer 118 may comprise a color filter, for example where the microstructures are configured to absorb light at a selected wavelength. The layer 118 may comprise a polarizer, for example where the microstructures are elongated and/or are configured to absorb light at all visible wavelengths. The microstructures may have an index of refraction less than the index of refraction of the optical propagation region. The matrix may have an index of refraction less than the index of refraction of the optical propagation region.

In certain alternative embodiments, the optical isolation layer 118 of an illumination apparatus 110 comprises a volume hologram that changes the direction of light in either a controlled or uncontrolled manner. Such a hologram, may comprise, for example, a holographic diffuser. This volume hologram may comprise matrix material having an index of refraction less than the index of refraction of the optical propagation region 116. Accordingly, light incident on the interface between the optical propagation region 116 and the hologram at oblique or grazing angles of incidence (greater than the critical angle) can be reflected by total internal reflection. As described above, light rays propagating through the light propagation region 116 at grazing incidence are contained via reflection within the optical propagation region 116, which has a higher refractive index than the engineered volume diffuser 118, while light originating in the ambient or turned by an illumination film at low angles of incidence are, for example, negligibly or minimally reflected.

Figure 12:
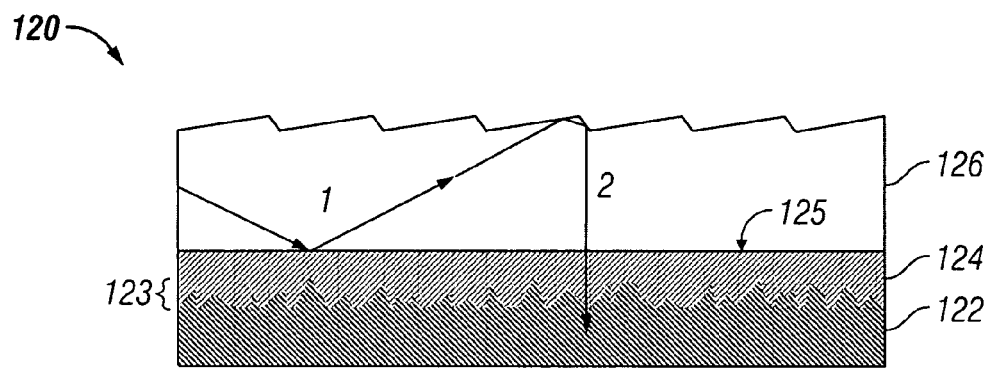
FIG. 12 is a cross section of a portion of yet another example embodiment of a display device wherein the optical loss layer comprises a surface diffuser having surface variation and the optical isolation layer comprises a layer that planarizes the surface variation.

FIG. 12 illustrates a portion of yet another example embodiment of an illumination apparatus 120 comprising an optical isolation layer 124 between an optical propagation region 126 and an optical loss layer 122 comprising a surface-structured optical element. The optical propagation region 126 may comprise, for example, a light guide (e.g., as illustrated in FIG. 9A), a light guide and a substrate (e.g., as illustrated in FIG. 9B), a light guide with a turning film laminated thereon, adhesive layers, and the like. The optical isolation layer 124 comprises a material having an index of refraction that is lower than the smallest index of refraction of the elements comprising the optical propagation region 126, thereby optically decoupling the optical propagation region 126 from the optical loss layer 122, e.g., via total internal reflection. Accordingly, the lower interface 125 between the optical propagation region 126 and the optical loss layer 122 total internally reflects light incident thereon at grazing angles (e.g., angles greater than the critical angle), while the interface 125 is essentially transparent for light incident thereon at lower angles (e.g., angles close to normal to the interface 125) so that light can interact with the optical element 122. The reflectivity plots of FIG. 10C may also be applied to certain embodiments of the illumination apparatus illustrated in FIG. 12, as well.

The optical loss layer 122 comprises a diffuser 122 including an engineered surface structure 123 having substantially spatially periodic, random, or spatially non-periodic features configured to diffuse light. Such a surface structure may comprise, for example, a holographic diffuser. The surface structure 123 of the diffuser 122 can be adjusted so that when the diffuser 122 is adjacent to the optical isolation layer 124 having a low index of refraction, the diffusion properties of the diffuser 122 are similar to when the diffusion properties of a diffuser 122 adjacent to air. In certain embodiments, the optical isolation layer 124 planarizes an interface 125 between the engineered surface structure 123 of the optical loss layer 122 and the rest of the illumination apparatus 120. Such a planar interface 125 may allow for better and/or easier attachment (e.g., lamination) of the optical loss layer 122 to the optical propagation region 126. For example, attachment of the optical loss layer 122 to the optical propagation region 126 may otherwise include air gaps. The optical loss layer 122 may also comprise randomized holographic microstructured films (e.g., directional diffusers available from Physical Optics Corporation of Torrance, Calif., etc.), holographic gratings, and the like. The optical isolation layer 124 may be coupled to the optical loss layer 122 by, for example, wet coating the surface of the structured optical loss layer 122 in a roll-to-roll process so as to effectively planarize the surface relief 123.

Figure 13A:
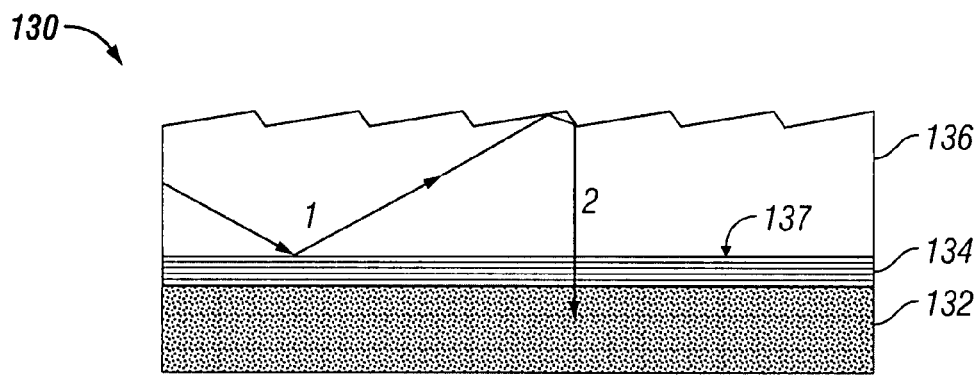
FIG. 13A is a cross section of a portion of still another example embodiment of a display device comprising a light guide having an optical propagation region decoupled from an optical loss layer by an optical isolation layer, wherein the optical isolation layer comprises a multi-layer stack.

FIG. 13A illustrates yet another example embodiment of an illumination apparatus 130 comprising an optical propagation region 136 decoupled from an optical loss layer 132 by an optical isolation layer 134 comprising low index material. The optical propagation region 136 may comprise, for example, a light guide (e.g., as illustrated in FIG. 9A), a light guide and a substrate (e.g., as illustrated in FIG. 9B), a light guide with a turning film laminated thereon, adhesive layers, and the like. The optical isolation layer 134 comprises a plurality of material layers in a multi-layer interference stack 134 that is configured to have a high reflectivity for light propagating through the optical propagation region 136 at grazing incidence and to have a low reflectivity for light at low angles of incidence (e.g., light turned by an illumination film or originating in the ambient). In certain embodiments, the plurality of material layers includes interference layers that utilize the properties of thin-film interference to obtain the desired reflection characteristics. For example, the layers may include sub-wavelength (e.g., $\lambda/4$) thin films of various materials (e.g., dielectric materials). In some embodiments, the optical isolation layer 134 includes films having varying indices of refraction. In one such embodiment, films are provided that alternate between indices of refraction higher than the index of refraction of the optical propagation region 136 and lower than the index of refraction of the optical propagation region 136. For example, the optical isolation layer 134 may include two films, one having an index of refraction higher than the index of refraction of the optical propagation region 136 and one having an index of refraction lower than the index of refraction of the optical propagation region 136.

Similar to the other optical isolation layers described herein, the multi-layer interference stack 134 can be used to decouple an optical propagation region 136 (e.g., a light guide film or film stack, a light guide film or film stack plus a substrate, etc.) from any variety of optical loss layer 132 (e.g., a diffuser, polarizer, colored filter, absorber, and the like). Accordingly, a lower interface 137 between the optical propagation region 136 and the optical loss layer 132 total internally reflects light incident thereon at grazing angles (e.g., angles greater than the critical angle), while the interface 137 is essentially transparent for light incident thereon at higher angles (e.g., angles close to normal to the interface 137). The optical isolation layer 134 can be physically provided (e.g., coated or deposited) on the optical propagation region 136, may be provided on a base film (or layer or multi-layer stack) that becomes part of the optical propagation region 136, or could be coated or deposited on the optical loss layer 132. Other methods of manufacturing are also possible.

Figure 13B:
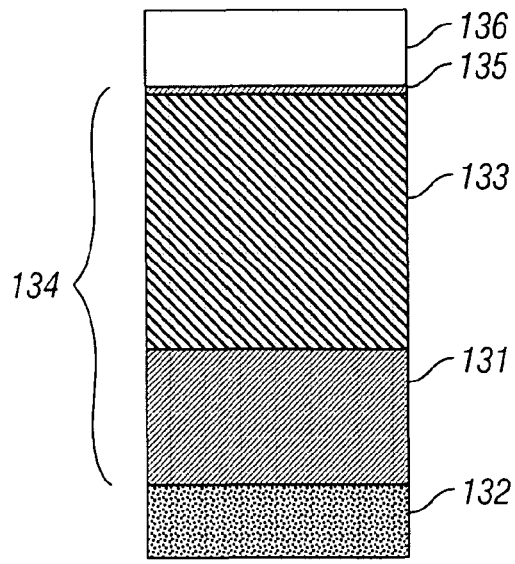
FIG. 13B is an expanded cross section of the multi-layer stack of FIG. 13A.

FIG. 13B illustrates an example embodiment of a multi-layer interference stack 134 comprising a layer 131 of titanium dioxide ($TiO_2$) having an index of refraction of about 2.32, a layer 133 of magnesium fluoride ($MgF_2$) having an index of refraction of about 1.38, and a second layer 135 of titanium dioxide having an index of refraction of about 2.32. Other materials are also possible. At least one of the layers 131, 133, 135 comprises a material that has an index of refraction that is lower than the index of refraction of the optical propagation region 136, for example, magnesium fluoride in embodiments in which the optical propagation region 136 comprises glass having an index of refraction of about 1.52.

Figure 13C:
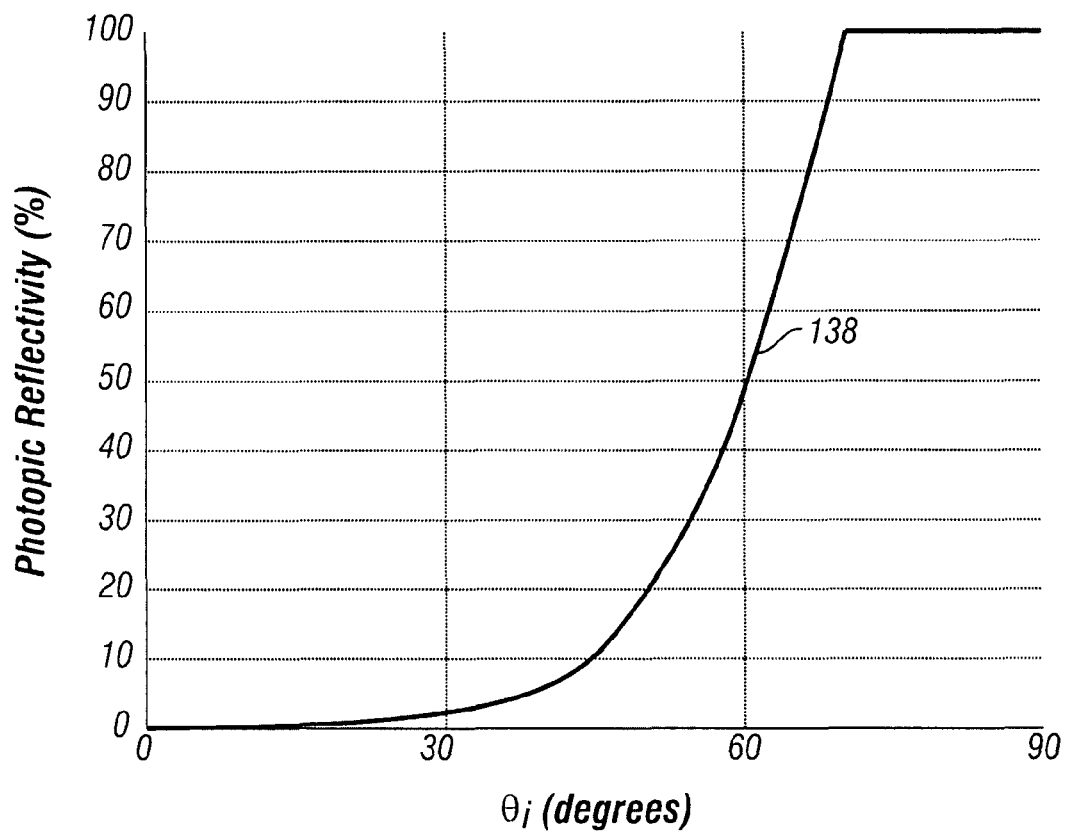
FIG. 13C illustrates the photoptic reflectivity at different angles of incidence for an example embodiment of an optical propagation region.

FIG. 13C graphically illustrates the photopic reflectivity of an example multi-layer interference stack 134 at different angles of incidence. Solid line 138 depicts the photopic reflectivity of an optical propagation region 136 comprising polycarbonate having an index of refraction of about 1.59 and a multi-layer interference stack 134 comprising 6.7 nm of titanium dioxide, 221.8 nm of magnesium fluoride, and 117.5 nm of titanium dioxide 131. The reflectivity for angles of incidence greater than about 70° is about 100% and the reflectivity of the angles of incidence below about 40° is nearly zero (e.g., due to Fresnel reflection, as described above). It will be appreciated that various structures (materials, thicknesses, number of layers, orientation of layers, uniformity, and the like) may impact the reflectivity curve, any may therefore be optimized to improve the optical decoupling.

A wide variety of different embodiments are also possible. Films, layers, components, and/or elements may be added, removed, or rearranged. Additionally, processing steps may be added, removed, or reordered. Also, although the terms "film" and "layer" have been used herein, such terms as used herein may include film stacks and multilayers. Such film stacks and multilayers may be adhered to other structures using adhesives or may be formed on other structures using deposition or in other manners.

Moreover, although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while several variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. A display device comprising:
a plurality of display elements;
an optical propagation region including a light guide in which light is guided via total internal reflection, said optical propagation region further including turning features configured to redirect said light out of said optical propagation region and towards the plurality of display elements; and
an optical isolation layer coupled to the optical propagation region, the optical isolation layer positioned between the plurality of display elements and the optical propagation region, the optical isolation layer positioned forward of a viewing side of the display elements, the optical isolation layer including a matrix and microstructure, wherein the matrix extends from the top to the bottom of the optical isolation layer, wherein the microstructure is configured to provide an optical loss structure disposed forward of the viewing side of the display elements, at least a portion of the optical isolation layer having an index of refraction less than an index of refraction of the optical propagation region, the at least a portion of the optical isolation layer configured such that light is totally internally reflected in said optical propagation region without utilizing an air gap layer disposed adjacent to the optical propagation region and between the optical propagation region and the display elements, wherein the optical isolation layer is adjacent to the display elements and adjacent to the optical propagation region.

2. The display device of claim 1, wherein the microstructure has an index of refraction less than the index of refraction of the optical propagation region.

3. The display device of claim 1, wherein the matrix has an index of refraction less than the index of refraction of the optical propagation region.

4. The display device of claim 1, wherein the microstructure is configured to scatter light.

5. The display device of claim 1, wherein the microstructure is configured to absorb light at a selected range of wavelengths.

6. The display device of claim 1, wherein the microstructure is elongated.

7. The display device of claim 1, the microstructure further including a plurality of particulates, a first of the particulates differing in size from a second of the particulates.

8. The display device of claim 1, wherein the microstructure is configured to absorb light at all visible wavelengths.

9. The display device of claim 1, wherein the microstructure includes voids.

10. The display device of claim 1, wherein the microstructure is spaced from the optical propagation region by a layer of the matrix.

11. The display device of claim 10, wherein the layer of the matrix has a thickness of less than about 1 μm.

12. The display device of claim 1, wherein the optical propagation region includes a film or a slab.

13. The display device of claim 12, wherein the optical propagation region further includes a substrate having the film or the slab formed thereon.

14. The display device of claim 1, wherein the optical propagation region includes a film stack.

15. The display device of claim 14, wherein the optical propagation region further includes a substrate having the film stack formed thereon.

16. The display device of claim 1, further comprising a turning film or a diffractive optical element having said turning features formed therein.

17. The display device of claim 1, wherein the indices of refraction of the portion and the optical propagation region are sufficiently close that Fresnel reflection at normal incidence is less than about 4%.

18. The display device of claim 1, further comprising:
 a processor that is configured to communicate with said display elements, said processor being configured to process image data; and
 a memory device that is configured to communicate with said processor.

19. The display device of claim 18, further comprising a driver circuit configured to send at least one signal to the display elements.

20. The display device of claim 19, further comprising a controller configured to send at least a portion of the image data to the driver circuit.

21. The display device of claim 18, further comprising an image source module configured to send said image data to said processor.

22. The display device of claim 21, wherein the image source module includes at least one of a receiver, transceiver, and transmitter.

23. The display device of claim 18, further comprising an input device configured to receive input data and to communicate said input data to said processor.

24. A method of manufacturing a display device, the method comprising:
 providing an optical propagation region configured to guide light via total internal reflection between top and bottom surfaces of the optical propagation region, wherein providing the optical propagation region includes:
  providing a substrate, wherein the optical propagation region includes the substrate; and
  disposing turning features over a first side of the substrate, the turning features configured to redirect the light out of the optical propagation region;
 coupling an optical isolation layer to a second side of the substrate, the optical isolation layer including a matrix and microstructure, wherein the matrix extends from the top to the bottom of the optical isolation layer, wherein the microstructure is configured to provide an optical loss structure and
 disposing a plurality of display elements over the optical isolation layer on the second side of the substrate wherein the substrate provides support to the display elements during fabrication wherein the optical isolation layer is positioned forward of a viewing side of the display elements;
 wherein at least a portion of the optical isolation layer has an index of refraction less than an index of refraction of the optical propagation region, the at least a portion of the optical isolation layer configured such that light is totally internally reflected in the optical propagation region without utilizing an air gap layer disposed adjacent to the optical propagation region and between the optical propagation region and the display elements.

25. The method of claim 24, wherein the at least a portion of the optical isolation layer is configured such that at least light having an angle of incidence of about 67 degrees is totally internal reflected in the optical propagation region.

26. The display device of claim 1, wherein the optical isolation layer includes a volume hologram.

27. The display device of claim 1, wherein the at least a portion of the optical isolation layer is configured such that at least light having an angle of incidence of about 67 degrees is totally internal reflected in the optical propagation region.

28. The display device of claim 1, wherein the microstructure occupies about 10% or less by volume of the optical isolation layer.

29. The display device of claim 1, wherein the microstructure occupies about 5% or less by volume of the optical isolation layer.

30. The display device of claim 1, wherein the optical propagation region includes a substrate that provides support to the display elements.

31. The display device of claim 30, wherein the optical isolation layer is positioned on the same side of the substrate as the display elements.

32. The display device of claim 1, wherein the display elements are reflective display elements.

33. The display device of claim 32, wherein the display elements are interferometric modulators.

34. The method of claim 24, wherein the microstructure occupies about 10% or less by volume of the optical isolation layer.

35. The method of claim 24, wherein the microstructure occupies about 5% or less by volume of the optical isolation layer.

36. The method of claim 24, wherein the optical isolation layer is adjacent to the display elements.

37. The method of claim 24, wherein the display elements are reflective display elements.

38. The method of claim 37, wherein the display elements are interferometric modulators.

* * * * *